United States Patent
Mannweiler et al.

(10) Patent No.: US 12,004,211 B2
(45) Date of Patent: Jun. 4, 2024

(54) MANAGEMENT AND ORCHESTRATION AIDED TRANSPARENT OF 3GPP NETWORK INTO TSN BASED INDUSTRIAL NETWORK

(71) Applicant: NOKIA SOLUTIONS AND NETWORKS OY, Espoo (FI)

(72) Inventors: Christian Mannweiler, Munich (DE); Peter Rost, Heidelberg (DE); Christian Markwart, Munich (DE); Borislava Gajic, Unterhaching (DE); Rakash Sivasiva Ganesan, Unterhaching (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 164 days.

(21) Appl. No.: 17/052,673

(22) PCT Filed: May 8, 2018

(86) PCT No.: PCT/EP2018/061892
§ 371 (c)(1),
(2) Date: Nov. 3, 2020

(87) PCT Pub. No.: WO2019/214810
PCT Pub. Date: Nov. 14, 2019

(65) Prior Publication Data
US 2021/0243771 A1 Aug. 5, 2021

(51) Int. Cl.
*H04W 72/543* (2023.01)
*H04W 24/02* (2009.01)
*H04W 28/02* (2009.01)

(52) U.S. Cl.
CPC ......... *H04W 72/543* (2023.01); *H04W 24/02* (2013.01); *H04W 28/0268* (2013.01)

(58) Field of Classification Search
CPC ... H04W 72/08; H04W 72/087; H04W 24/00; H04W 24/02; H04W 28/00; H04W 28/02;
(Continued)

(56) References Cited

U.S. PATENT DOCUMENTS

| 7,092,358 B2 * | 8/2006 | Ruutu | H04L 47/24 |
| | | | 370/395.42 |
| 7,096,260 B1 * | 8/2006 | Zavalkovsky | H04L 47/10 |
| | | | 370/232 |

(Continued)

FOREIGN PATENT DOCUMENTS

| EP | 2223474 A1 * | 9/2010 | ......... H04L 12/5695 |
| WO | WO-2016153984 A1 * | 9/2016 | ........... H04L 5/0058 |

OTHER PUBLICATIONS

International Search Report and Written Opinion dated Oct. 5, 2018 corresponding to International Patent Application No. PCT/EP2018/061892.

(Continued)

*Primary Examiner* — Kevin D Mew
(74) *Attorney, Agent, or Firm* — Lippes Mathias LLP

(57) ABSTRACT

It is provided a method comprising monitoring if a reservation request is received from a controller, wherein the reservation request requests to reserve resources for a data session having a first quality of service; translating the reservation request into a request for providing a data session of a wireless network having a requested quality of service corresponding to the first quality of service if the reservation request is received; forwarding the request for providing the data session to the wireless network; translating an indication of a provided quality of service of the data session comprised in a response to the request for providing the data session received from the wireless network into an indication of a reserved quality of service corresponding to the provided quality of service; responding to the reservation request by a reservation response; wherein the reservation response comprises the indication of the reserved quality of service.

10 Claims, 14 Drawing Sheets

(58) Field of Classification Search
CPC ......... H04W 28/0221; H04W 28/0231; H04W 28/0236; H04W 28/0252; H04W 28/0268
See application file for complete search history.

(56) References Cited

U.S. PATENT DOCUMENTS

| | | | | |
|---|---|---|---|---|
| 8,392,631 | B1* | 3/2013 | Mora | H04L 67/141 710/33 |
| 9,036,518 | B2* | 5/2015 | Takagi | H04W 72/0426 370/310.2 |
| 10,044,524 | B1* | 8/2018 | Edelhaus | H04L 65/65 |
| 2006/0116128 | A1* | 6/2006 | Benveniste | H04W 28/02 455/445 |
| 2008/0049628 | A1* | 2/2008 | Bugenhagen | H04L 43/026 370/254 |
| 2011/0314145 | A1* | 12/2011 | Raleigh | H04L 47/2475 709/224 |
| 2013/0114424 | A1* | 5/2013 | Maguluri | H04W 72/566 370/255 |
| 2013/0272121 | A1* | 10/2013 | Stanwood | H04L 47/2475 370/230 |
| 2013/0298170 | A1* | 11/2013 | ElArabawy | H04L 47/2416 725/62 |
| 2014/0094159 | A1* | 4/2014 | Raleigh | H04W 24/02 455/418 |
| 2014/0094208 | A1* | 4/2014 | Egner | H04L 5/0023 455/513 |
| 2014/0281037 | A1* | 9/2014 | Spada | H04J 3/0641 709/248 |
| 2016/0234828 | A1* | 8/2016 | Smith | H04W 16/14 |
| 2017/0272972 | A1* | 9/2017 | Egner | H04L 47/2441 |
| 2018/0191634 | A1* | 7/2018 | Karthikeyan | H04L 67/61 |
| 2020/0137615 | A1* | 4/2020 | Joseph | H04W 24/02 |
| 2020/0219386 | A1* | 7/2020 | El Assaad | G08G 1/0112 |

OTHER PUBLICATIONS

"NGP Recommendation for Mobile Deterministic Networking," ETSI Draft Specification; NGP 008, European Telecommunications Standards Institute (ETSI), vol. ISG NGP Next Generation Protocols, No. V0.0.2, Nov. 24, 2017, pp. 1-16, XP014303441.

Marina Gutierrez et al: "Self-configuration of IEEE 802.1 TSN networks," 2017 22nd IEEE International Conference on Emerging Technologies and Factory Automation (ETFA), IEEE, Sep. 12, 2017, pp. 1-8, XP033292931.

Qualcomm Incorporated: "FS_5GLAN Editorial Clean-up," 3GPP Draft; S1-180557, 3GPP TSG-SA WG1 Meeting #81, Fukuoka, Japan, Feb. 12, 2018, XP051405872.

Farzaneh Morteza Hashemi et al: "An ontology-based Plug-and-Play approach for in-vehicle Time-Sensitive Networking (TSN)," 2016 IEEE 7th Annual Information Technology, Electronics and Mobile Communication Conference (IEMCON), IEEE, Oct. 13, 2016, pp. 1-8, XP033009779.

3GPP TS 29.561 V0.5.0 (Apr. 2018), Technical Specification, 3rd Generation Partnership Project; Technical Specification Group Core Network and Terminals; 5G System; Interworking between 5G Network and external Data Networks; Stage 3 (Release 15), Apr. 26, 2018, pp. 1-42, XP051451185.

Wilfried Steiner et al: "Next generation real-time networks based on IT technologies," 2016 IEEE 21st International Conference on Emerging Technologies and Factory Automation (ETFA), IEEE, Sep. 6, 2016, pp. 1-8, XP032994563.

3GPP TS 23.501 V15.0.0 (Dec. 2017), Technical Specification, 3rd Generation Partnership Project; Technical Specification Group Services and System Aspects; System Architecture for the 5G System; Stage 2 (Release 15), Dec. 2017.

3GPP TR 22.804 V0.3.0 (Nov. 2017), Technical Report, 3rd Generation Partnership Project; Technical Specification Group Services and System Aspects; Study on Communication for Automation in Vertical Domains; (Release 16), Dec. 2017.

R. Hummen et al., "TSN—Time Sensitive Networking," White Paper, Hirschmann, WP00027, 2019.

IEEE 802.1Qcc, Stream Reservation Protocol (SRP) Enhancements and Performance Improvements, http://www.ieee802.org/1/pages/802.1cc.html.

IEEE 802.1 Working Group Policies and Procedures, http://www.ieee802.org/1/.

E. Gardiner et al., "Theory of Operation for TSN-enabled Systems applied to Industrial Markets," Revision 1.0, Avnu Alliance, 2017.

* cited by examiner

\* Multiple options for M&O on what QoS values to provide

\*\* Based on the chosen option for M&O interaction the port values will correspond either to default PDU session or other PDU sessions established during network discovery

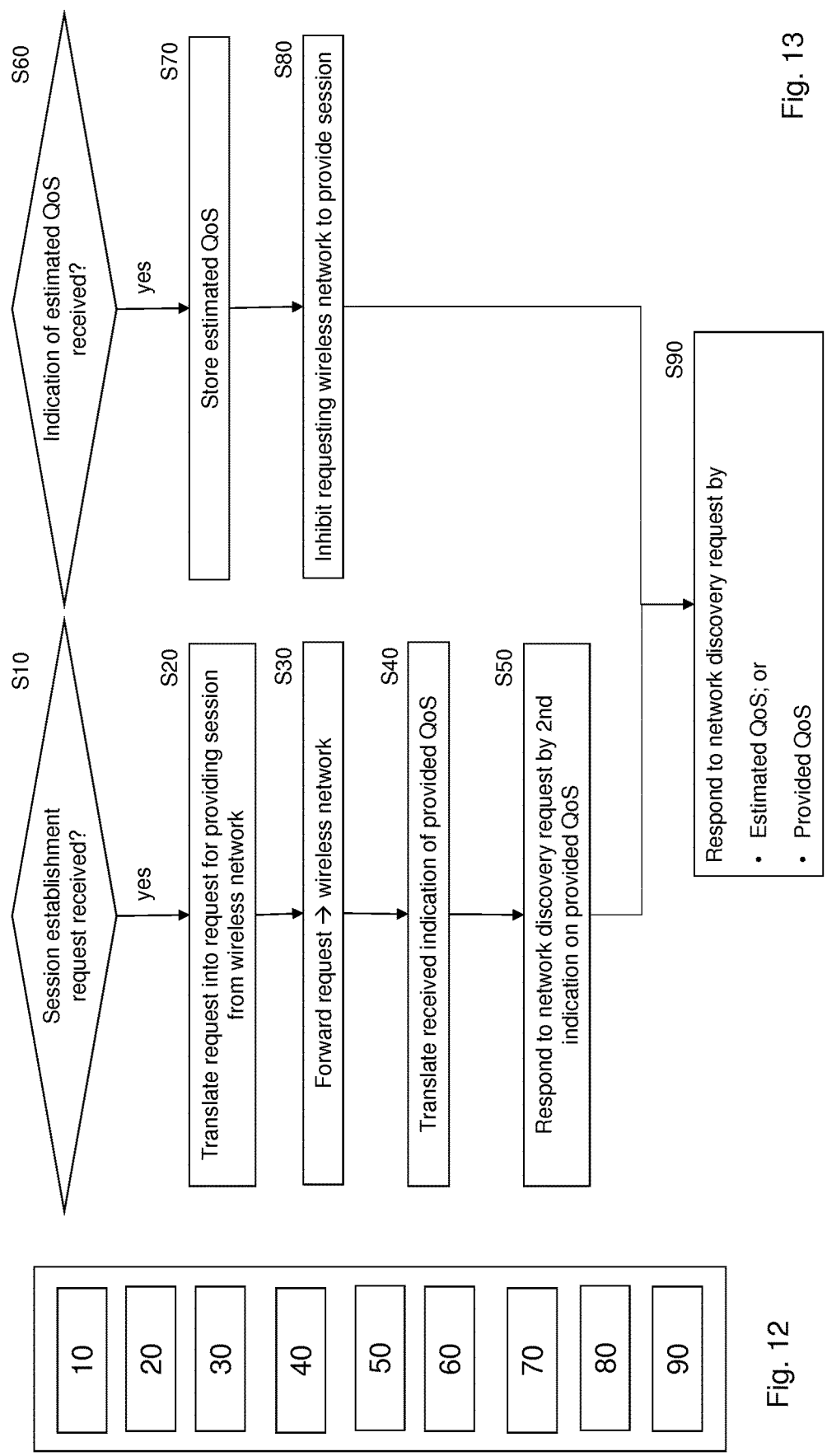

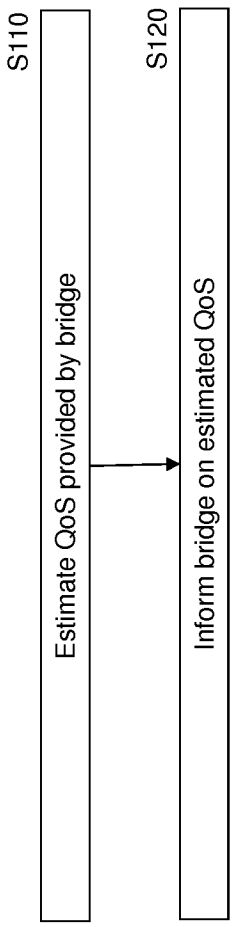
Fig. 15
Fig. 14
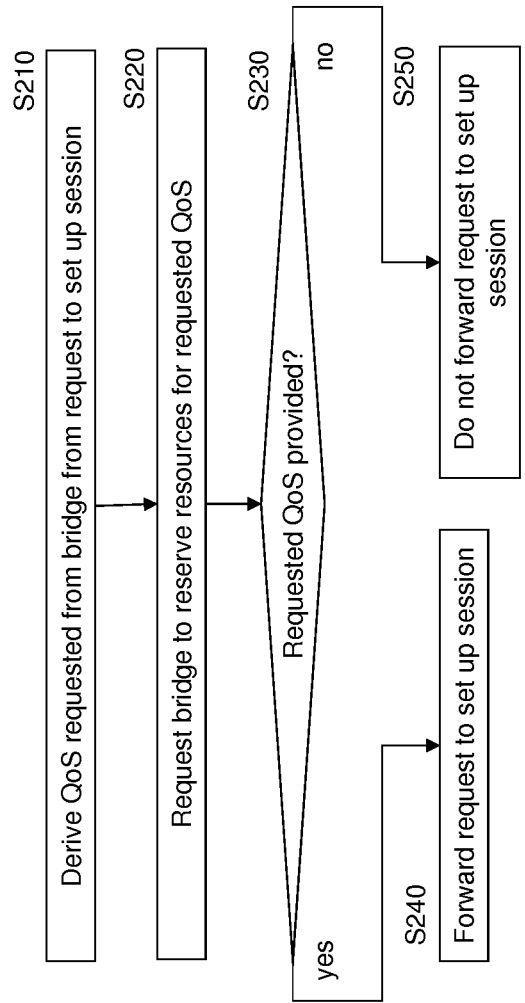
Fig. 17
Fig. 16

MANAGEMENT AND ORCHESTRATION AIDED TRANSPARENT OF 3GPP NETWORK INTO TSN BASED INDUSTRIAL NETWORK

FIELD OF THE INVENTION

The present invention relates to an apparatus, a method, and a computer program product related to transparent integration of a wireless network (e.g. a 3GPP network) into a wireline network (e.g. a TSN network).

BACKGROUND OF THE INVENTION

Time sensitive networking (TSN) [1] is being standardized by IEEE (Institute of Electrical and Electronics Engineers) 802.1 to provide industrial networks with deterministic delay to handle time sensitive traffic. Currently, wired links are assumed for connecting the sensors and controllers. Moving from wired to wireless sensors and actuators provide advantages, such as mobility, scalability, low cost maintenance etc. To connect the wireless devices to a TSN network, wireless transmission mechanisms such as defined in 3GPP (3 rd Generation Partnership Project) are necessary.

FIG. 1 shows the entities involved in TSN. One of the key consideration for TSN standardization is to have a centralized entity, named CNC (Centralized Network Controller), which collects the requirements of end to end communication between the Talker End Stations and Listener End Stations and performs scheduling centrally. The Bridges learn the connection information for their immediate network peer in each physical port using the link layer discovery protocol (LLDP). Each TSN network has a single CNC. In addition, there might be multiple centralized user configurators (CUCs) which translate the requirements of the end to end communication and communicate it to the CNC. Furthermore, the CUC is responsible for configuring the respective Talker and Listener End Stations with transmission parameters computed by the CNC during the scheduling process. The solid arrows in FIG. 1 describe the main steps 1-6 involved in establishing a communication between a Talker and a Listener End Station [2].

Namely, according to 1), CUC obtains the stream Quality of Service (QoS) from the endstations. Then, according to 2) CUC provides the stream QoS requirements to CNC. In 3a) CNC calculates schedules, paths etc. in order to fulfil the stream QoS requirements, which are reported to CUC in 3b). In 4a) and 4b), CUC configures, via CNC, the managed objects of the bridges accordingly. CNC informs in 4c) CUC about successful configuration of the bridges. Namely, Stream Trans. Info contains the configuration parameters that the Talker End Station needs to use e.g. destination MAC address, VLAN ID and PCP field. It also has the transmit time window in which the Talker should transmit and the receive time window in which the listener should expect to receive the packets. Then, in 5) CUC configures the end stations accordingly. In parallel, as shown by dashed lines in FIG. 1, network discovery procedures run between related entities (i.e., between neighboured bridges, between each bridge and CNC, between CNC and CUC, and between each station and the respective bridge it is connected to). After that, in 6), transmission between talker end stations and listener end stations may be performed.

Note that the bridges are time-aware in a TSN network. There may be one or more bridges between a talker end station and a respective listener end station. In FIG. 1, two bridges are shown as an example. Each talker end station may talk to one or more listener end stations, and each listener end station may listen to one or more talker end stations. A listener end station of one communication may be a talker end station of another communication.

Currently, in industries, TSN is used as a mechanism to provide end to end connectivity with deterministic capacity and delay. The talkers (e.g., sensors, controllers) and listeners (e.g. controllers, actuators) are connected through bridges using cables.

Time sensitive networking (TSN) [1] is currently standardized as the mechanism for communication within industrial networks. A set of IEEE 802.1 protocols [3] (IEEE 802.1AS-Rev, 802.1CB, 802.1Qcc, 802.1Qch, 802.1Qci, 802.1Qcj, 802.1CM, 802.1Qcp, 802.1Qcr, 802.1AB) is applied to achieve deterministic data transmission with guaranteed low latency with time-aware devices (which need to be configured properly).

3GPP started in 2017 a study on communication for Automation in Vertical Domains to identify respective requirements for wireless communication [4], [5]. So far, neither 3GPP Rel. 15 nor Rel. 16 include solutions on integrating 3GPP networks with TSN.

REFERENCES

[1] R. Hummen, S. Kehrer, O. Kleineberg, "TSN—Time Sensitive Networking", White Paper, Hirschmann

[2] IEEE 802.1Qcc, Stream Reservation Protocol (SRP) Enhancements and Performance Improvements, http://www.ieee802.org/1/pages/802.1cc.html

[3] http://www.ieee802.org/1/[4]

3GPP, TS 23.501 V15.0.0 "System Architecture for the 5G System; Stage 2 (Release 15)", December 2017

[5] 3GPP TR 22.804 V0.3.0 "Study on Communication for Automation in Vertical Domains (Release 16)", December 2017

[6] E. Gardiner et al., "Theory of Operation for TSN-enabled Systems applied to Industrial Markets", Avnu Alliance, 2017

SUMMARY OF THE INVENTION

It is an object of the present invention to improve the prior art.

According to a first aspect of the invention, it is provided an apparatus, comprising first means for monitoring configured to monitor if a session establishment request is received from a wireline network, wherein the session establishment request requests providing a first requested quality of service for a first data session to a station of the wireline network; first means for translating configured to translate the session establishment request into a request for providing a second data session of a wireless network having a second requested quality of service corresponding to the first requested quality of service; first means for forwarding configured to forward the request for providing the second data session to the wireless network; second means for translating configured to translate an indication of a second provided quality of service of the second data session comprised in a response to the request for providing the second data session received from the wireless network into an indication of a first provided quality of service of the first data session; first means for responding configured to provide a response to the session establishment request, wherein the response to the session establishment request comprises the indication of the first provided quality of service; means for observing configured to observe if a first indication of an estimated quality of service is received; means for storing configured to store a second indication of the estimated quality of service if the first indication of the estimated quality of service is received; means for inhibiting configured to inhibit requesting the wireless network to provide a third data session due to the receiving of the first indication of the estimated quality of service; second means for responding configured to respond to an inquiry by an inquiry response, wherein the inquiry response comprises a third indication of the estimated quality of service if the second indication of the estimated quality of service is stored and the response to the session establishment is not provided, and the inquiry response comprises an indication of the first provided quality of service if the response to the session establishment is provided.

According to a second aspect of the invention, there is provided an apparatus, comprising means for monitoring configured to monitor if a reservation request is received from a controller, wherein the reservation request requests to reserve resources for a data session having a first quality of service; first means for translating configured to translate the reservation request into a request for providing a data session of a wireless network having a requested quality of service corresponding to the first quality of service if the reservation request is received; means for forwarding configured to forward the request for providing the data session to the wireless network; second means for translating configured to translate an indication of a provided quality of service of the data session comprised in a response to the request for providing the data session received from the wireless network into an indication of a reserved quality of service corresponding to the provided quality of service; means for responding configured to respond to the reservation request by a reservation response; wherein the reservation response comprises the indication of the reserved quality of service.

According to a third aspect of the invention, there is provided an apparatus, comprising means for predicting configured to predict that a bridge provides a predicted quality of service for a stream through the bridge based on at least one of settings related to previous streams through the bridge and network planning information; means for informing configured to inform the bridge on the predicted quality of service.

According to a fourth aspect of the invention, there is provided an apparatus, comprising means for deriving configured to derive a first requested quality of service to be provided by a bridge for a session based on a request for setting up the session received from a user configurator; means for requesting configured to request the bridge to reserve a resource to provide the first requested quality of service to the session; means for checking configured to check if the bridge provides the first requested quality of service to the session based on a response received from the bridge in response to the requesting; means for forwarding configured to forward the request for setting up the session to a network controller different from the user configurator if the bridge provides the first requested quality of service; means for inhibiting configured to inhibit the forwarding of the request for setting up if the bridge does not provide the first requested quality of service.

According to a fifth aspect of the invention, there is provided a method, comprising monitoring if a session establishment request is received from a wireline network, wherein the session establishment request requests providing a first requested quality of service for a first data session to a station of the wireline network; translating the session establishment request into a request for providing a second data session of a wireless network having a second requested quality of service corresponding to the first requested quality of service; forwarding the request for providing the second data session to the wireless network; translating an indication of a second provided quality of service of the second data session comprised in a response to the request for providing the second data session received from the wireless network into an indication of a first provided quality of service of the first data session; providing a response to the session establishment request, wherein the response to the session establishment request comprises the indication of the first provided quality of service; observing if a first indication of an estimated quality of service is received; storing a second indication of the estimated quality of service if the first indication of the estimated quality of service is received; inhibiting requesting the wireless network to provide a third data session due to the receiving of the first indication of the estimated quality of service; responding to an inquiry by an inquiry response, wherein the inquiry response comprises a third indication of the estimated quality of service if the second indication of the estimated quality of service is stored and the response to the session establishment is not provided, and the inquiry response comprises an indication of the first provided quality of service if the response to the session establishment is provided.

According to a sixth aspect of the invention, there is provided a method, comprising monitoring if a reservation request is received from a controller, wherein the reservation request requests to reserve resources for a data session having a first quality of service; translating the reservation request into a request for providing a data session of a wireless network having a requested quality of service corresponding to the first quality of service if the reservation request is received; forwarding the request for providing the data session to the wireless network; translating an indication of a provided quality of service of the data session comprised in a response to the request for providing the data session received from the wireless network into an indication of a reserved quality of service corresponding to the provided quality of service; responding to the reservation request by a reservation response; wherein the reservation response comprises the indication of the reserved quality of service.

According to a seventh aspect of the invention, there is provided a method, comprising predicting that a bridge provides a predicted quality of service for a stream through the bridge based on at least one of settings related to previous streams through the bridge and network planning information; informing the bridge on the predicted quality of service.

According to an eighth aspect of the invention, there is provided a method, comprising deriving a first requested quality of service to be provided by a bridge for a session based on a request for setting up the session received from a user configurator; requesting the bridge to reserve a resource to provide the first requested quality of service to the session; checking if the bridge provides the first requested quality of service to the session based on a response received from the bridge in response to the requesting; forwarding the request for setting up the session to a network controller different from the user configurator if the bridge provides the first requested quality of service; inhibiting the forwarding of the request for setting up if the bridge does not provide the first requested quality of service.

Each of the methods of the fifth to eighth aspects may be a method of TSN integration.

According to a ninth aspect of the invention, it is provided a computer program product comprising a set of instructions which, when executed on an apparatus, is configured to cause the apparatus to carry out the method according to any of the fifth to eighth aspects. The computer program product may be embodied as a computer-readable medium or directly loadable into a computer.

According to some embodiments of the invention, at least one of the following advantages may be achieved:
- flexibility (in terms of mobility) of the TSN network is enhanced;
- scalability (in terms of number of sensors or actuators) is enhanced;
- modifications to the TSN network and the 3GPP network are not required;
- resources are efficiently used.

It is to be understood that any of the above modifications can be applied singly or in combination to the respective aspects to which they refer, unless they are explicitly stated as excluding alternatives.

BRIEF DESCRIPTION OF THE DRAWINGS

Further details, features, objects, and advantages are apparent from the following detailed description of the preferred embodiments of the present invention which is to be taken in conjunction with the appended drawings, wherein:

FIG. 12 shows an apparatus according to an embodiment of the invention;

FIG. 13 shows a method according to an embodiment of the invention;

FIG. 14 shows an apparatus according to an embodiment of the invention;

FIG. 15 shows a method according to an embodiment of the invention;

FIG. 16 shows an apparatus according to an embodiment of the invention;

FIG. 17 shows a method according to an embodiment of the invention;

DETAILED DESCRIPTION OF CERTAIN EMBODIMENTS

Herein below, certain embodiments of the present invention are described in detail with reference to the accompanying drawings, wherein the features of the embodiments can be freely combined with each other unless otherwise described. However, it is to be expressly understood that the description of certain embodiments is given by way of example only, and that it is by no way intended to be understood as limiting the invention to the disclosed details.

Moreover, it is to be understood that the apparatus is configured to perform the corresponding method, although in some cases only the apparatus or only the method are described.

The first part of the following description is substantially taken from PCT/EP2018/054916, which is in its entirety incorporated by reference. The present application provides an improvement over the former application in terms of resource usage.

In a main target scenario, the tactile industrial network, also known as Industrial IoT (IIoT) or Industry 4.0 networks, 3GPP technologies are applied in addition to wired time sensitive networking (TSN) in industrial environments to provide flexibility (in terms of mobility) and scalability (in terms of number of sensors or actuators).

The introduction of wireless devices provides more flexibility, cost effectiveness and scalability in the system, but requires for example a wireless network as defined by 3GPP to provide predictable QoS for the communication. TSN and 3GPP networks are developed and standardized as two disjoint domains which are managed independently. To support a wireless connection based on 3GPP technology, only either of these two standards is supported in a network. There are no over-arching entities or concepts developed in order to handle the interaction between these two domains.

A TSN End Station "A" communicates with a TSN End Station "B" via a time sensitive communication link of a TSN Network to use a wireless communication service based on 3GPP technologies. A TSN Translator and a TSN Translator Client, which acts on behalf of the TSN Translator integrate a 3GPP network into the TSN network domain in a transparent manner. I.e., to the TSN network, the wireless communication service of a 3GPP network acts similar to a TSN bridge, while the TSN network acts as a data service to the 3GPP network.

Figure 1:
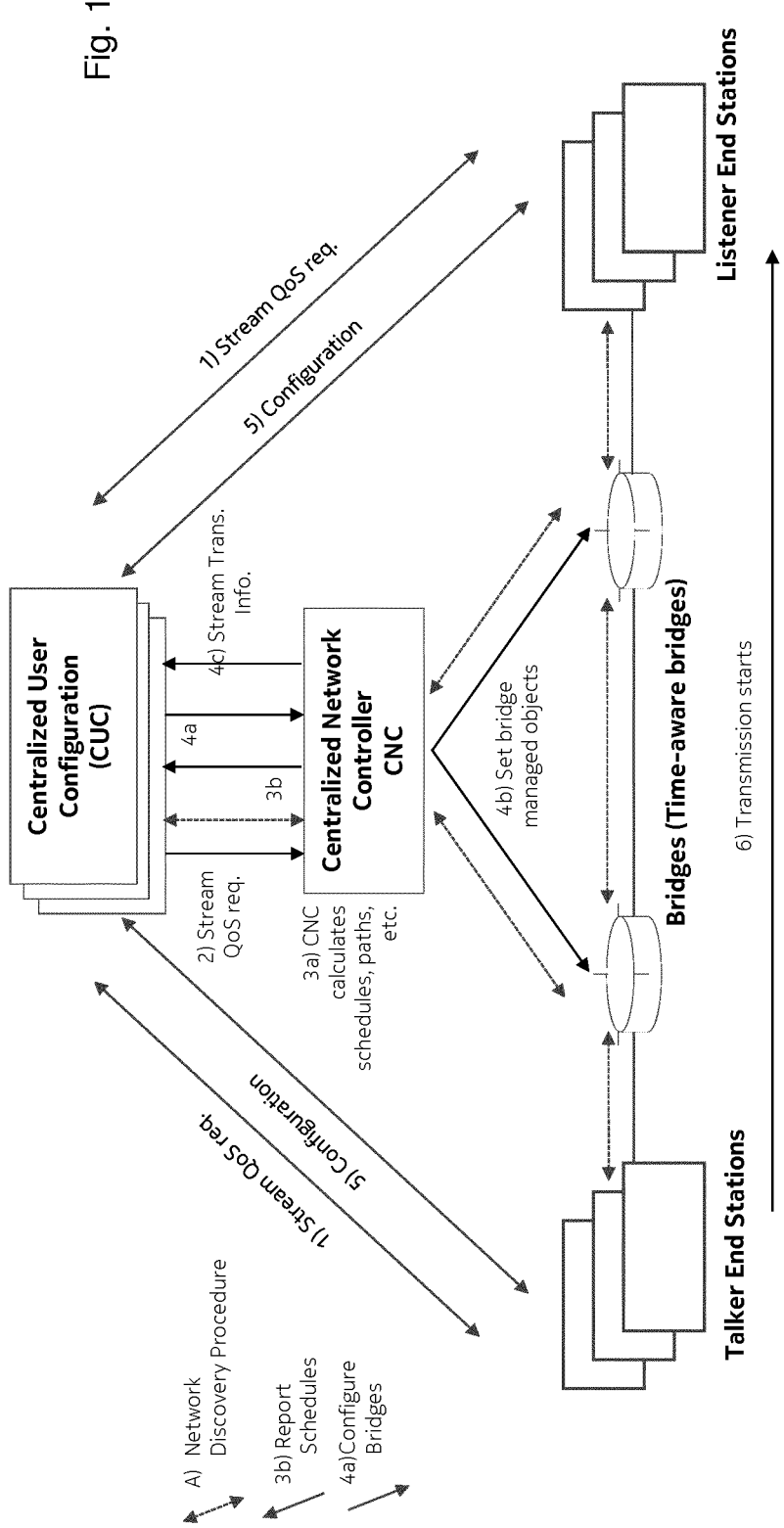
FIG. 1 shows a functional and simplified diagram of a TSN network including a flow of commands.
Figure 2:
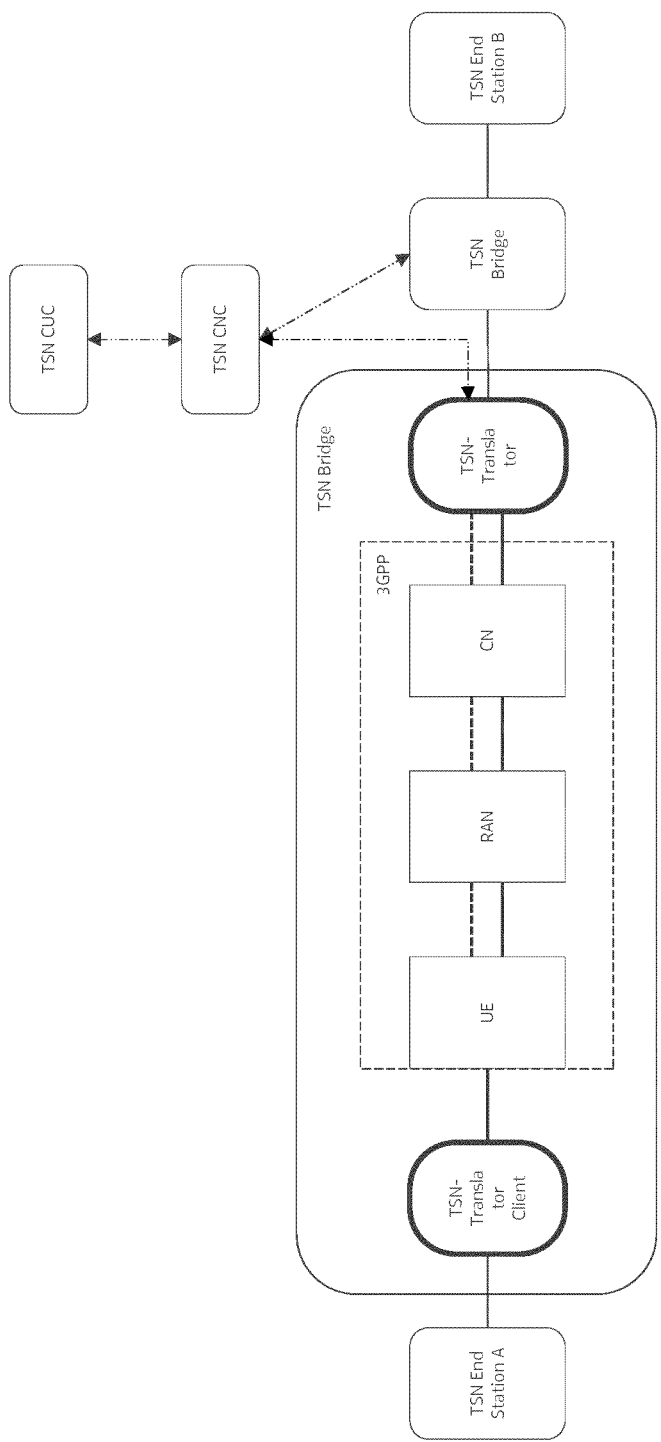
FIG. 2 shows a functional and simplified diagram of a TSN network using a wireless communication service based on 3GPP.

FIG. 2 shows the general concept of the TSN Translator and its TSN Translator Client and how the TSN End Station A is connected to the TSN network via a wireless connection service provided by the 3GPP network. FIG. 2 corresponds to FIG. 1, but one of the bridges is replaced by the 3GPP network embedded between the TSN translator and the TSN translator client.

In FIG. 2 the entities of the TSN network are shown by round edged boxes and those of the 3GPP network are shown by sharp edged boxes. The UE, RAN and CN together constitute the 3GPP network which is enclosed within a dashed line box. The solid lines connecting the entities represent the data plane and the dotted lines the control plane. The TSN translator and TSN translator client shown by bold rounded boxes enable the transparent integration of the TSN network and the 3GPP network. The round edged box consisting of TSN translator, TSN translator client, and 3GPP network constitute the logical TSN bridge formed on top of the 3GPP network. Note: For simplicity, the communication paths of the TSN CUC with the TSN End Stations A and B are not shown in FIG. 2.

The TSN End Station A is connected to a UE via the TSN Translator Client. The UE is responsible to establish and handle the wireless connection service for the TSN End station A. The wireless connection service contains beside the wireless link between UE and Radio Access Network (RAN) also essential Core Network (CN) services to provide for example authentication, mobility, QoS, etc.

For the transparent usage of the wireless connection service and to hide specific behavior of the 3GPP network to the TSN network and vice versa, a TSN translator function is provided, which works as an intermediator between both domains, i.e. it understands the TSN protocol and maps the TSN CUC and TSN CNC messages as well as the TSN network messages into control and user plane messages of the 3GPP network to trigger corresponding actions in the 3GPP network, e.g. to trigger the establishment of a wireless connection with guaranteed QoS, and vice versa. Furthermore, it takes cares of services like the enforcement of the priority classes for the traffic, frame translation, time gating etc which are typically offered by the bridges in the wired network to guarantee deterministic communication. With respect to this view, the TSN Translator and TSN Translator client are placed on both sides of the 3GPP network, the UE side and the CN side.

The TSN Translator and the TSN Translator Client are logically part of the same translation between 3GPP and TSN network and hence, it is beneficial that they do not act independently. Treating them as one entity allows to hide the TSN Translator at the UE side to the TSN network and to use the TSN Translator at the CN side to represent the complete 3GPP network as a TSN bridge to the TSN Network. This simplifies especially the configuration and handling at the TSN CNC and the respective TSN CUCs. The TSN translator performs the major part of the translation of the TSN protocols to 3GPP commands and procedures and vice versa. The TSN Translator client at the UE side acts on behalf of the TSN Translator at the CN side and is therefore called TSN Translator Client.

The integration of the TSN Translator with the TSN network is done by implementing the protocols for an TSN bridge, the TSN ethernet protocol to exchange messages between a TSN bridge with another TSN ethernet bridge or TSN End Station B (user plane traffic, also called data traffic) and the protocol to exchange information with the TSN CNC (control plane). Additionally, the respective communication of the TSN End Station A with the TSN CUC is also handled via the TSN Translator and its TSN Translator Client.

Typically, 3GPP network interfaces provide a set of functions which are defined for a specific 3GPP release. Therefore, the TSN Translator as well as the TSN Translator Client are designed to adapt to respective new releases. As long as a 3GPP release is not closed, 3GPP may introduce additional interfaces or adaptations to interfaces or even new functional entities which allows for optimizing or simplifying respective handling of the communication for TSN networks. An example for such an adaptation is the introduction of the new PDU session type "Ethernet" to handle ethernet traffic. The TSN Translator as well as the TSN Translator Client hide the release specifications to the TSN network. The same is valid for the 3GPP network when the TSN network introduces new functions and interface modifications.

Figure 3:
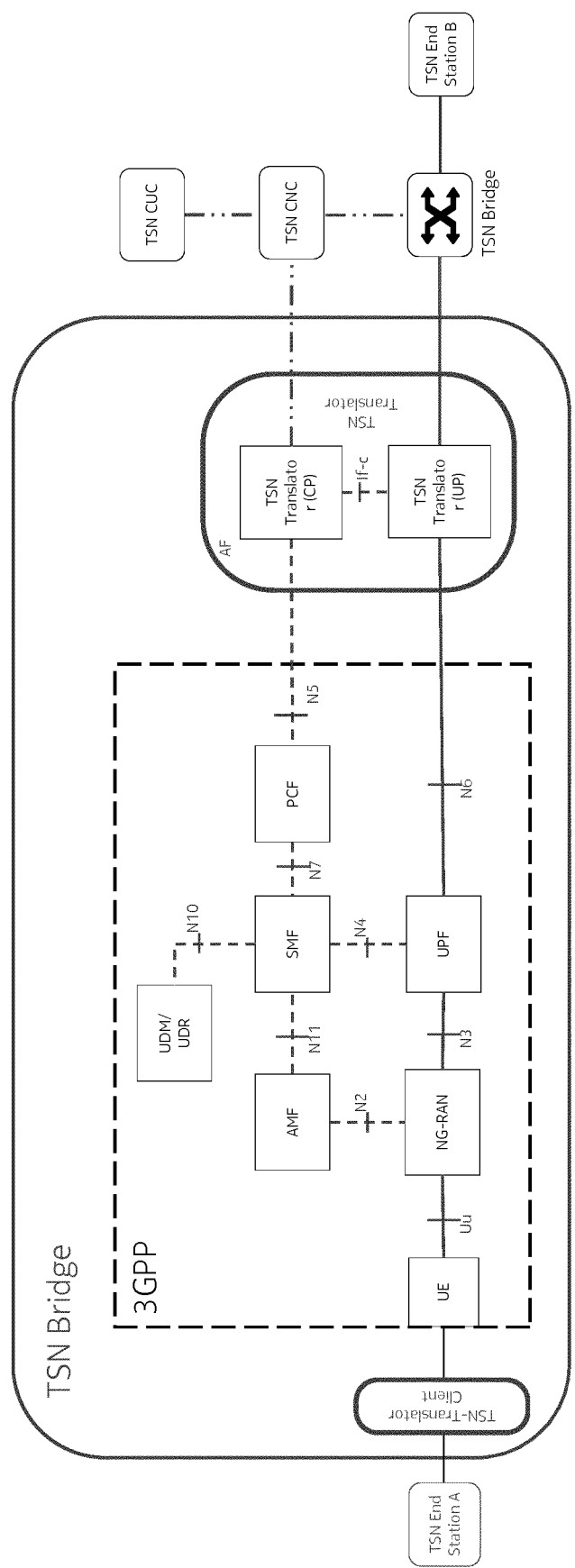
FIG. 3 shows an example implementation of a 3GPP network integrated into a TSN network.

FIG. 3 shows an example implementation for integrating TSN network with a 3GPP network. The entities in the 3GPP network, shown within the dashed box labelled 3GPP, are possible functional entities resulting from the 3GPP release 15 standardization. This example could be mapped to other 3GPP releases or non-3GPP wireless networks. The TSN End Stations A and B could be a sensor, controller, actuator or any other industrial device. In this picture, UE is shown as a separate entity, however, it could be either integrated in the End Station A or can be plugged in to the TSN End Station. Similarly, the TSN Translator Client could also be an integrated part of TSN End Station A, UE, or both.

In FIG. 3, TSN Translator and its TSN Translator Client work as an intermediator between both domains, i.e., it understands the TSN protocol and the 3GPP protocols and maps the TSN commands and messages into corresponding actions and messages in a 3GPP network providing 5G and vice versa.

Two key types of information messages are differentiated by the TSN Translator:

1) The network configuration related messages of the TSN network we denote in the following by the term control plane (CP) (see also in FIG. 3) in order to be consistent with the naming convention of mobile network terminology. The CP messages, e.g. link layer discovery protocol messages are converted into the corresponding control plane messages and procedures in a 3GPP network. The control plane messages and procedures are used to establish for example a packet data unit (PDU) session or a service flow and to provide for example required QoS parameters for the service flow within the PDU session. The TSN translator has an interface to respective 3GPP functional entities of the core network (CN), e.g. in FIG. 3 the policy control function (PCF) of a 5G network, which interacts directly or indirectly with further 3GPP CN functional entities like Session Management Function (SMF) and Access & Mobility Management Function (AMF). The TSN Translator acts from the 3GPP network point of view as Application Function (AF) and uses the N5 interface. In addition, the TSN Translator derives information provided by its TSN Translator Client and the AF to act as a TSN Bridge in the TSN network. A typical example is the Link Layer Discovery protocol required at a TSN bridge to be interoperable with the TSN network.

Alternatively, other options, which are not shown in FIG. 3 may be used to interact between 3GPP CN and TSN Translator. The TSN Translator may provide an interface to the Network Exposure Function (NEF) when authentication and authorization features are needed, or a new functional entity in 3GPP domain could be created which provides the functionality of the TSN Translator in a standardized way. SBI (service based interfaces) may also be used to realize interfaces to the TSN Translator function.

2) For the transmission of data between the End Station A and End Station B, the TSN Translator has an interface to the User Plane Function (UPF) and the corresponding interface to the TSN Bridge that connects to the TSN End Station B, which we denote in the following by the term user plane (UP), again to align with the terminology applied in 3GPP networks. In FIG. 3, the UP of the TSN translator acts as a data network to the 3GPP network. On the other side, for the adjacent TSN Bridge and for CNC, it looks like a TSN bridge. With respect to the user plane functionality, the TSN translator shall offer the following functions:

a. Removes the header information from the IP packets received at UPF and create the corresponding TSN packet
b. Maps the packets received in a particular PDU session to the packets to be transmitted from the corresponding egress port
c. Depending on the QoS flow of the given PDU session, place the packet in the corresponding priority queue of a specific port
d. Based on the gate control list specified by the CNC, it shall transmit the packets from one of the different queues through the egress port. The gate control list specifies at which time interval a packet from a specified priority queue can be transmitted at a particular egress port.
e. If the packet arrives delayed such that the gate control for this packet in the current interval is already closed, then this packet shall be dropped and not transmitted.
f. Shall introduce guard band between the transmission intervals
g. Shall pre-empt the ethernet packets, which started its transmission in the previous time interval, in order to make the port be available for the packets scheduled to be transmitted at the current time interval Similar translation shall be performed when the TSN packets arrive at the TSN translator ingress ports. The priority queues shall be implemented at the translator or the translator client or both.

The UP part of the TSN Translator is realized either as:

a. UPF with extended TSN functionality: In this case, both UPF and TSN Translator UP are within a single box and intermediation between the UPF protocol and the TSN protocol is performed internally as shown in FIG. 3 or
b. UPF and TSN translator UP act as two separate entities: In this case, interface between them is a proprietary interface or the N6 interface as defined by 3GPP is extended to support the TSN capabilities Similar to the TSN Translator, CP and UP translation is performed by the TSN Translator Client. The TSN Translator Client works on behalf of the TSN Translator so that the TSN Translator Client, 3GPP network and TSN Translator together appear to be a TSN bridge for the TSN network and the TSN End Station A. The TSN Translator Client offers a blocked security port to the TSN End Station A, so that the TSN End Station A can send authentication related messages to the TSN CNC.

The following functions are provided by the TSN Translator and its TSN Translator Client together with the 3GPP network to achieve transparent integration in the TSN network:

1. The TSN Translator and its TSN Translator Client are enabled to initiate PDU sessions and QoS flows with a set of pre-defined QoS parameter, e.g. 5G QoS indicator (5QI), in the 3GPP network, which are used to exchange information between TSN Translator Client and TSN Translator. The PDU sessions and respective QoS flows are used to transport information between:

[1] TSN End Station A and TSN CUC (e.g. authentication and authorization)
   [2] TSN Translator and its TSN Translator Client (e.g. link layer discovery protocol)
   [3] TSN End Station A and TSN End Station B (e.g. measurement data from a sensor to a controller)

2. The UE connected to the TSN Translator Client establishes the wireless connection to the 3GPP Core Network domain, based on standardized 3GPP authentication and authorization procedures. The TSN Translator Client, which is connected to the UE may provide additional credentials allowing to check if the UE and TSN Translator Client together are authorized to establish a wireless connection. Optionally, the TSN Translator Client provides further credentials of the connected TSN End Station A that is added to the credentials.

3. The 3GPP network allows to establish additional PDU sessions and QoS flows for existing and/or the new PDU sessions with a set of pre-defined QoS parameter (e.g. 5QI), which is controlled by a Policy Control Function PCF, optionally considering information provided by the TSN Translator and its TSN Translator Client on required minimum or average throughput, traffic pattern (e.g. cyclic data), maximum or average allowed packet loss, maximum or average latency, and jitter. A typical PDU session would define a maximum delay (10 ms) and further information, which needs to be guaranteed with high probability (99.999%) and minimum guaranteed bit rate (less than 1 Mbps). The information may be derived from information provided by the TSN network containing TSN CUC, TSN CNC, TSN End Stations A, and/or TSN End Station B.

4. The TSN Translator and its TSN Translator Client supports the Link Layer Discovery Protocol (LLDP) and participates in the network discovery procedure executed by the TSN CNC. The PDU session and the QoS flow represent the connection between the UE and the UPF. This information is mapped to TSN Bridge managed object's parameters, which are then reported by the TSN Translator to the TSN CNC.

5. The TSN Translator and its TSN Translator Client has at least one of the following functions:
   [1] Mapping of control plane information from the TSN network and the TSN End Stations to 3GPP control plane information
   [2] Mapping of control plane information from the TSN network and the TSN End Stations to information exchanged between TSN Translator and it's TSN Translator Client
   [3] Mapping of control plane information from the 3GPP network to information exchanged between TSN Translator and TSN Translator Client, and TSN network and the TSN End Stations
   [4] Handling of TSN user plane, including the time gating at the egress port and the ingress port
   [5] Handling of Time Synchronization in the TSN network
   [6] Access control for TSN end station 6. The 3GPP network may provide multiple PDU sessions for the UE connected to the TSN Translator Client to realize at least one wireless connection in the 3GPP network. Each PDU session may contain multiple QoS flows with a defined set of QoS parameters for each. The TSN Translator and its TSN Translator Client maps each QoS session and its QoS parameters to TSN Bridge managed object's parameters and reports them to the TSN CNC to allow more flexible options for the computed schedule.

Figure 4:
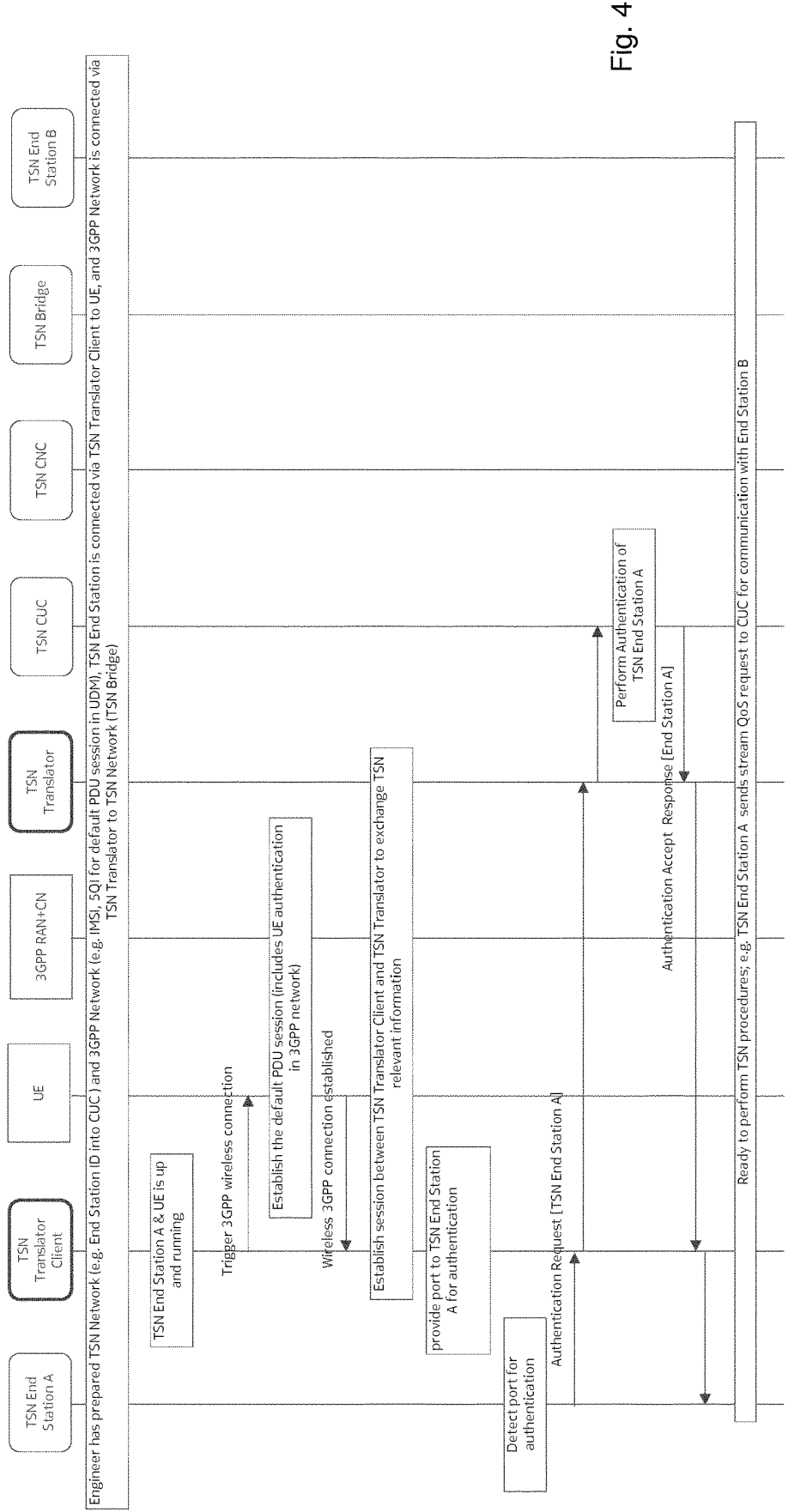
FIG. 4 shows an example flow diagram for initial setup of the TSN network integrating the 3GPP network.
Figure 5:
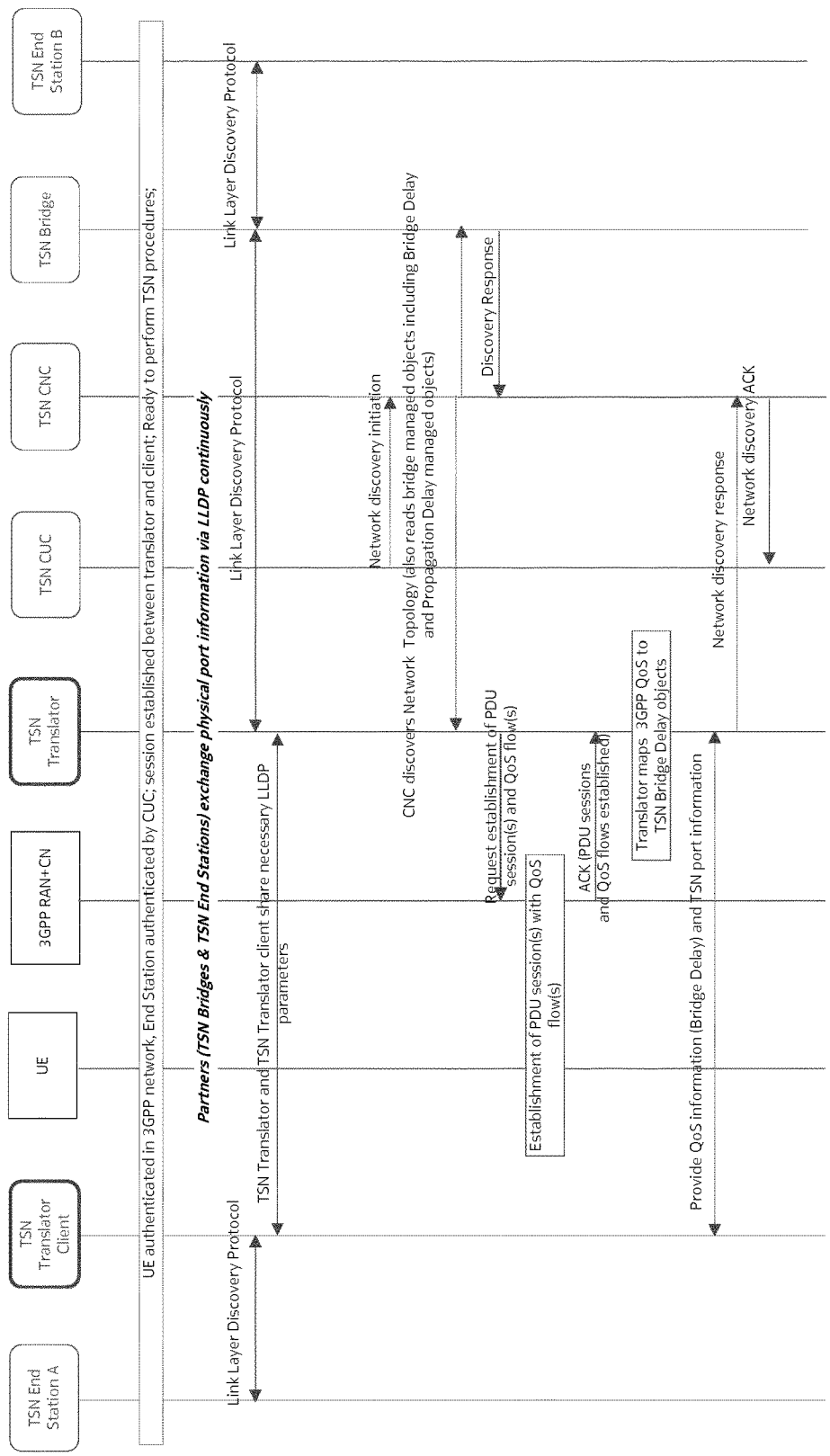
FIG. 5 shows an example flow diagram for network discovery of the TSN network integrating the 3GPP network.
Figure 6:
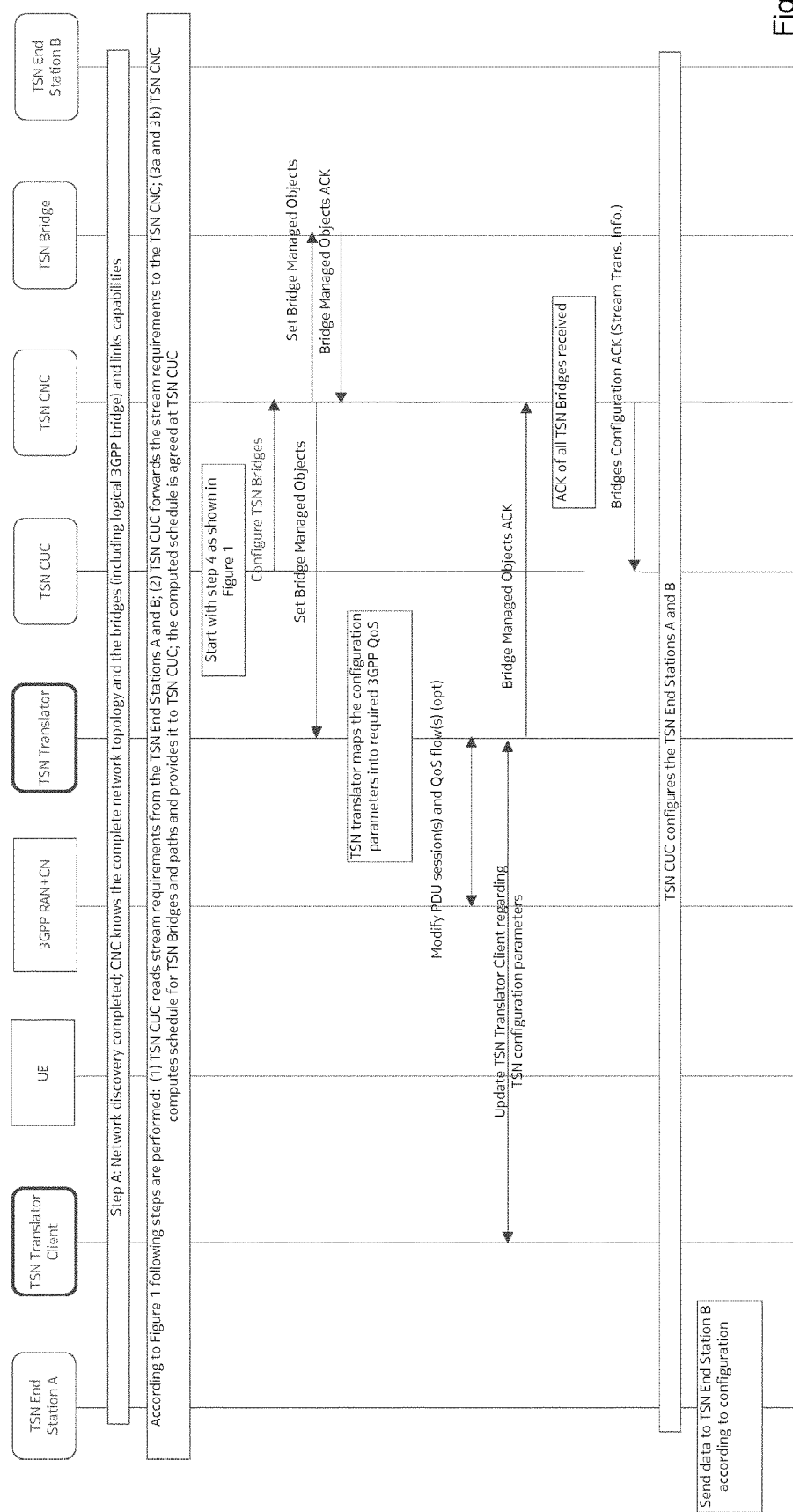
FIG. 6 shows an example flow diagram for establishment of an end-to-end communication through the TSN network integrating the 3GPP network.

FIGS. 4, 5, and 6 shows in an exemplary way how the TSN Translator and its TSN Translator Client interact with the 3GPP network and its entities when providing a wireless communication service to a TSN network and its TSN entities. For simplification and a better understanding, it is assumed that the CP traffic is handled in a default PDU session with respective QoS flow(s) and a second PDU session with respective QoS flows handles the UP traffic. FIG. 4 illustrates the initial setup of the 3GPP-TSN network, FIG. 5 illustrates the discovery of network entities in a TSN network, and FIG. 6 illustrates the establishment of an end to end communication between TSN End Station A and TSN End Station B.

The flow in FIG. 4 is as follows:

1. First an engineer or a configuration tool, which informs the TSN CUC regarding the devices that are allowed to connect to the network, enters the device information e.g. International Mobile Subscriber Identity (IMSI) into the UDM of the 3GPP network so that this user equipment (UE) can be connected successfully afterwards. For simplicity of the description, the case when the UE and the TSN End Station A are integrated as one device is considered. In this case, the IMSI represents also the TSN End Station A in the 3GPP network. Otherwise, the TSN translator may perform a mapping between the identifier of the station in the TSN network and the IMSI of the UE. In addition to the IMSI information, other information like QoS parameter (5QI) category of the TSN End Station A are also entered to the UDM.
2. When the TSN Translator Client detects that TSN End Station A and UE are up and running (e.g. switched on), the TSN Translator Client triggers the UE to establish a wireless connection with the 3GPP network. During the establishment of the wireless connection between the UE and the 3GPP radio access network (RAN) and CN, the UE is authenticated by the 3GPP network. It is authenticated using the information registered in Authentication Server Function (AUSF) and admitted to a pre-defined default PDU session and QoS flow. The establishment of this default PDU session takes place in accordance with the 3GPP standardized procedures.
3. The default PDU session and QoS Flow is also used to exchange information between the TSN Translator and the TSN Translator Client via the wireless link. An example information exchange is, when the CNC sends the bridge configuration parameters to the 3GPP bridge (TSN translator), the TSN translator forwards the corresponding configuration parameters, like time window in which to expect the data packet at a specific ingress port, to the TSN translator client.
4. The TSN Translator Client provides a blocked security port to the TSN End Station A, which allows only authentication related messages to be sent to the TSN CUC.
5. When the TSN End Station A detects the blocked security port it sends an Authentication Request via the TSN translator client, the 3GPP network, and the TSN translator to the TSN CUC. Once the TSN translator client detects that TSN End Station A is authenticated by the TSN CUC, the TSN Translator Client opens the port for the other UP and CP TSN network communication. The TSN translation client may detect the authentication when it translates the respective message received from TSN CUC via TSN translator and 3GPP network. The respective traffic may use a different PDU session and different QoS flows. More details are described in FIG. 6.

The flow in FIG. 5 is as follows:

1. In the upper part of FIG. 5, the LLDP protocol is executed by the TSN Bridges and the TSN End Stations A and B through which they learn about the TSN network from their direct neighbors. The LLDP protocol is executed in a regular time interval so that the actual information about the neighboring stations is available and up to date [6]. The TSN Translator on the TSN network side and the TSN Translator Client on the TSN End Station A side also support the LLDP protocol and additionally exchange their TSN Bridge capabilities with the neighbors of the TSN network. LLDP protocol runs on links between bridges and end stations [6]. Link partners use this protocol to exchange physical port information with their direct peers. Such information includes e.g.:
   source port MAC address—MAC address of the sending port (either of end station or bridge)
   destination address—indicates that LLDP packets reach only the immediate link partner
   operating mode—"Transmit only" for end stations and "Transmit and Receive" for bridges as they can also receive LLDP packets, collect information about their peers and store it in Managed Objects
   Chassis ID Subtype, Port ID Subtype etc.
   Each bridge learns the connection information about their immediate peers (i.e. other bridges and connected end stations), store such information in Managed Objects that can be read by e.g. CNC using a Network Management protocol. In order to build overall network physical topology, the CNC reads for every bridge and for every port of a bridge the Managed Object information describing bridge connections. Managed Objects of bridges store also the performance metric information such as Bridge Delay and Propagation Delay which can be read by CNC while crawling the network to discover connectivity information.
2. The lower part of FIG. 5 shows how the TSN network is discovered by the TSN CNC, e.g. when initiated by the TSN CUC. The discovery information is used afterwards by the TSN CNC to compute the TSN schedule for a network path. During the discovery process, the TSN CNC will crawl through all the TSN bridges to collect information about the links they are connected to, their capacity, propagation delay, bridge delay and the devices attached to the ports available to them, from the bridge managed objects. Since the 3GPP network appears as a virtual TSN bridge to the TSN CNC, the TSN Translator and its TSN Translator Client manages corresponding bridge objects so that the TSN CNC can read this information.
   The ports of the virtual TSN Bridge offered to the TSN End Station A are handled by the TSN Translator Client and the ports on the 3GPP core network side are handled by the TSN Translator. At least one PDU session in 3GPP network represents the connection between one ingress port and one egress port of the virtual TSN Bridge. A PDU session's QoS flows with the different QoS parameters are analogous to the QoS parameters of the TSN network by means of mapping done by TSN Translator.
3. Triggered by the network discovery request issued by TSN CNC, the TSN Translator requests the establishment of at least one PDU session with the respective QoS flows pre-defined (e.g., default QoS) for the TSN End Station A that is associated with the UE in order to reserve the required resources in the 3GPP network for the UP traffic.
4. After establishing the PDU session, the 3GPP Network sends an acknowledgment (ACK') to the TSN Translator with the confirmed PDU session and QoS flow parameters of the established session. The TSN Translator maps the received information to corresponding so-called 'bridge delay' managed object parameters which can be returned to the TSN CNC as a response to the network discovery request.
5. The TSN translator may additionally request an indication of the port opened by the TSN translator client for communication with the TSN end station. The port may be predefined such that the request for the port is not needed. The TSN translator may request PDU session setup and the information on the port in an arbitrary sequence. The requests may be performed fully or partly in parallel.

The TSN CNC forwards the discovery information, as received from the TSN translator, to the TSN CUC.

The flow of FIG. 6 is as follows:
1. The TSN CUC reads the QoS parameters and stream requirements from the TSN End Stations A and B. This information and the information on the TSN End Stations A and B (e.g. medium access control (MAC) addresses) to be connected are then provided to the TSN CNC. The TSN CNC computes the scheduling related parameters for the TSN Bridges and the End Stations according to the TSN procedures shown in FIG. 1 and communicates the result to the TSN CUC.
2. When the TSN Translator receives the schedule and the information of the selected Managed Objects it checks whether or not changes are needed in the 3GPP network. Such changes may include for instance that some PDU sessions are not used or some QoS flows are not needed or require different QoS parameters. In such a case the TSN Translator triggers the 3GPP Network to close not used PDU session(s), QoS flow(s), and/or update QoS flow parameters respectively. As mentioned above this may be necessary to release the resources, which were reserved during the TSN network discovery shown in the lower part of FIG. 5.
3. When the TSN CNC has received the acknowledgements from the TSN Bridge(s) and the TSN Translator it informs the TSN CUC.
4. The TSN CUC configures the TSN End Stations A and B with the computed scheduling related parameters and finally initiates the start of the message transfer at the End Station A at a specified time.

The approach in PCT/EP2018/054916 offers a simple and effective solution for integration between TSN and 3GPP network, but at the cost of suboptimal resource reservation in the 3GPP network. Namely, in the phase of network discovery, in order to identify the capabilities of 3GPP part of the network (3GPP bridge), for each UE the establishment of at least one PDU session potentially needed in the future takes place. Although the established PDU sessions will be only used once the actual stream request from corresponding end station is issued, the resources in 3GPP network are already reserved during the network discovery phase. This provisional resource reservation may imply suboptimal resource exploitation and may lead to a rapid exhaustion of resources and inability of the network to support the incoming service requests. In other words, the simple and yet effective approach in PCT/EP2018/054916 might be inefficient from resource management point of view and consequently might face scalability issues.

Figure 7:
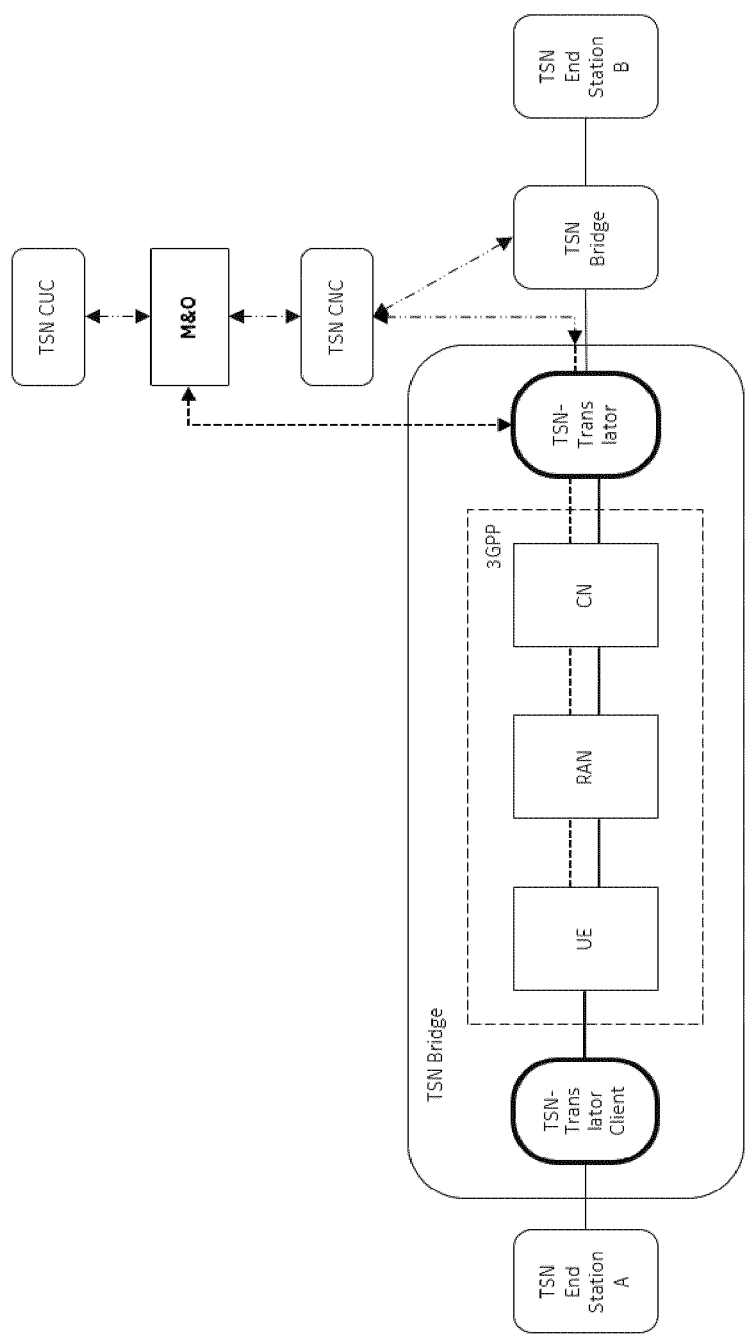
FIG. 7 shows a functional diagram of a TSN network for time sensitive communication using a wireless communication service based on 3GPP according to some embodiments of the invention.

Some embodiments of the invention build upon the solution described in PCT/EP2018/054916. In terms of the apparatus, some embodiments provide an additional, novel communication interface between the TSN Translator described in PCT/EP2018/054916 and the 3GPP Network Management and Orchestration (M&O) entity, as depicted in FIG. 7 (more detailed description of the FIG. 7 is provided later). Such interface enables the exchange of information between M&O and TSN Translator for optimization of resource reservation and allocation in a 3GPP network. The M&O entity is logically placed between TSN CUC and TSN CNC, and can "intercept" the messages between TSN CUC and TSN CNC. Having the wider information about the TSN network, i.e. available devices, their capabilities, available resources and their utilization, actual stream requests etc., M&O complements the TSN Translator function of PCT/EP2018/054916 by providing information and instructions for implementation of more efficient resource allocation in the 3GPP network during TSN 'network discovery' and 'stream setup' procedures.

More specifically, M&O can interact with the TSN Translator to indicate the desired amount of resources to be reserved/guaranteed by 3GPP network during TSN network discovery phase, i.e., before the actual stream requests are issued. Hence, in terms of a method, some embodiments of this invention propose three options for such interaction between M&O and TSN Translator, namely:
   a. M&O provides at least one (but potentially a set of) estimated QoS values for a 3GPP bridge (e.g. learned from previous setups or based on network planning) without requesting actual establishment of PDU sessions and reservation of resources; or
   b. M&O groups all known end stations (or a subset thereof) based on their registration profile (e.g., end station type, capabilities, requirements, traffic profile) and further information about the network topology etc. Based on such grouping, M&O may request the establishment of an according number of PDU sessions, with according QoS values, or may inform the TSN translator of the 3GPP bridge on the according QoS value without requesting actual establishment of PDU sessions and reservation of resources, as according to option a; or
   c. M&O intercepts stream requests issued by the TSN CUC towards the TSN CNC, based on which it can derive the requirements for the 3GPP network, and then requests establishment of according PDU sessions.

FIG. 7 corresponds to FIG. 2 to which M&O is added. The communication between M&O and the TSN Translator is part of the control plane.

In order to perform the translation between TSN and 3GPP network, the TSN translator relies on information and instructions provided by M&O. The M&O entity has wider information about the network in terms of devices, their requirements and capabilities, available resources and their utilization, traffic patterns, geo-locations of users and resources, etc. In the process of network discovery [6], CNC gathers the information about bridge and link delays. According to PCT/EP2018/054916, all PDU sessions that are possibly needed in future (at least one PDU session per UE) are established and the according QoS information is reported to CNC. In contrast, according to some embodiments of the invention, M&O offers at least one of the above mentioned three options for handling the process of network discovery, thus making it more efficient.

Following any of the three interaction options, M&O instructs the TSN Translator on number of PDU sessions to be established in the 3GPP network and/or 3GPP QoS values to be translated to TSN parameters (e.g. Bridge Delay) of 3GPP bridge.

After any change in the network that may affect already signaled parameters of 3GPP bridge, e.g. admission of additional UEs and new end stations, M&O may provide to TSN Translator corresponding updates. E.g., either it updates the estimated QoS values for 3GPP bridge or requests the PDU session setup with updated QoS values.

Figure 8:
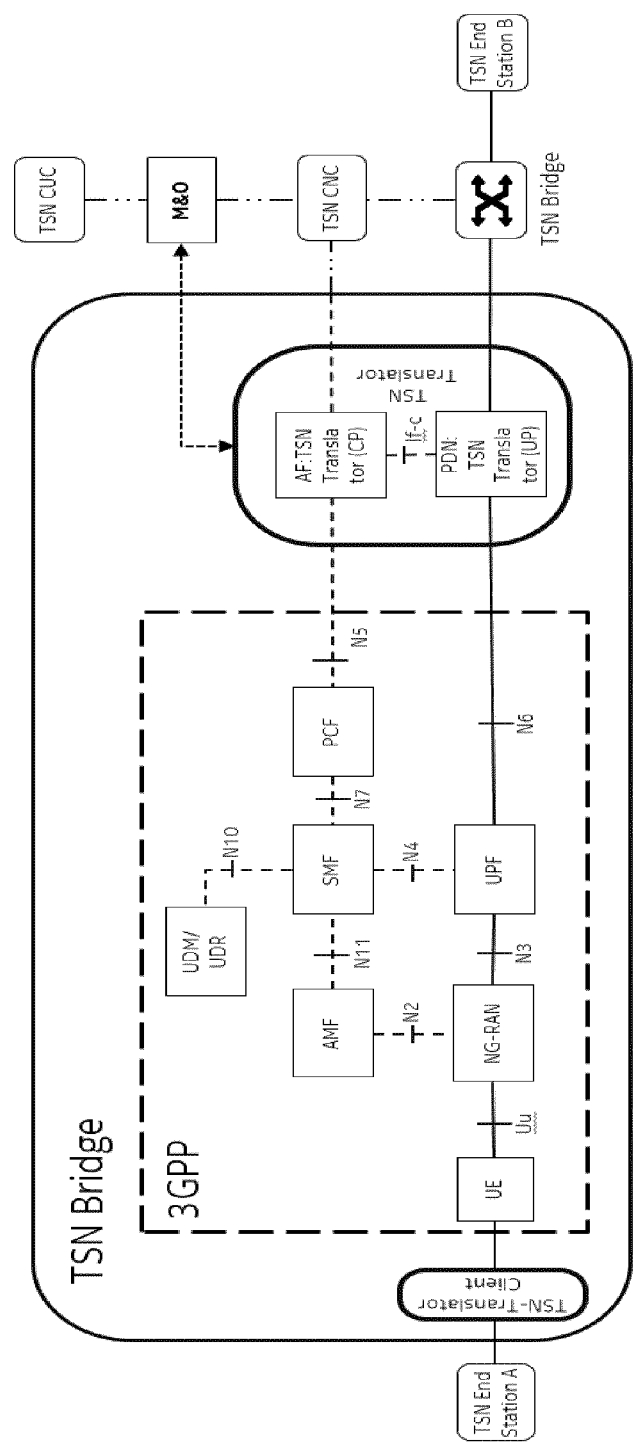
FIG. 8 shows a simplified implementation example for integrating TSN and 3GPP network according to some embodiments of the invention.

FIG. 8 shows an example implementation for integrating TSN network with a 3GPP network. In addition to implementation example described in PCT/EP2018/054916, TSN Translator (and its TSN Translator Client) is complemented by M&O entity.

The functions provided by the TSN Translator (and its TSN Translator Client) (cf. list of items 1 to 6 hereinabove) are extended/modified as follows:

List Item #3: The 3GPP network allows to establish additional PDU sessions and QoS flows for existing and/or the new PDU sessions with a set of pre-defined QoS parameter (e.g. 5QI), which is controlled by a Policy Control Function PCF upon instruction by the M&O entity. M&O entity derives such instructions based on the information about e.g. available end stations, their mapping to UEs, topological constraints, communication requirements of end stations (e.g. on required minimum or average throughput), traffic pattern (e.g. cyclic data), maximum or average allowed packet loss, maximum or average latency, and/or jitter. A typical PDU session may define a maximum delay (e.g. 10 ms) and further information, which needs to be guaranteed with high probability (e.g. 99.999%) and minimum guaranteed bit rate (e.g. at least 1 Mbps).

List Item #4: The TSN Translator and its TSN Translator Client supports the Link Layer Discovery Protocol (LLDP) and participates in the network discovery procedure executed by the TSN CNC. The PDU session and the QoS flow represent the connection between the UE and the UPF. This information is mapped to TSN Bridge managed objects' parameters, which are then reported by the TSN Translator to the TSN CNC. Also in the case that no PDU session is established, i.e. M&O entity only provided estimated QoS values for 3GPP network, such values are also mapped to TSN Bridge managed object's parameters.

List Item #5: In addition to the functions described in PCT/EP2018/054916 the TSN Translator shall have the following functions:
  [i] Mapping of information provided by M&O entity to the 3GPP control plane information (in particular mapping of TSN QoS values to required PDU sessions and according QoS flows)
  [ii] From [i], derivation of Bridge Delay object for 3GPP bridge
  [iii] Mapping of PDU sessions from [i] to TSN port information (e.g. MAC address of the bridge's sending port, c.f. [6])
  [iv] TSN Translator provides information from [iii] to TSN Translator Client In the following, an example way of interaction is described, i.e. how the TSN Translator and its TSN Translator Client interact with the 3GPP network and its entities (in particularly, M&O) when providing a wireless communication service to a TSN network and its TSN entities. For simplification and a better understanding, it is assumed that the TSN CP traffic is handled in a default 3GPP PDU session with respective QoS flow(s) and further PDU sessions with respective QoS flows handle the TSN UP traffic.

Initial Setup of 3GPP-TSN Network

The procedure of initial setup of 3GPP-TSN network for the purpose of TSN end station authentication follows the steps described in PCT/EP2018/054916. In addition, according to some embodiments of this invention:

1) All available information about devices (UEs and TSN end stations) (or a reasonable subset thereof, such as TSN end station ID, UE IMSI, UE category, allowed PDU session types and the default PDU session type, default 5QI values, SSC (session and service continuity) mode, static IP address/prefix, geolocation, applications hosted/used by the station, traffic profile (such as probability distribution of traffic volume), mobility profile, etc.) is provided to M&O entity already during the network planning phase and collected in a database. I.e., this information is provided to M&O during the step in which an engineer prepares TSN network (e.g. inserting end station ID into CUC) and 3GPP network (e.g. specifying IMSI, 5QI for default PDU session to UDM).

2) After a successful authentication of TSN end station by the CUC the acknowledge message is sent back from CUC to the end station. The M&O intercepts the information about newly authenticated TSN end station. This may serve as a trigger for updating the QoS values of 3GPP bridge provided by M&O entity.

Network Discovery Procedure

The LLDP protocol is executed by the TSN Bridges and the TSN End Stations A and B through which they learn about their direct neighbours. The LLDP protocol is executed in a regular interval so that the actual information about the neighbouring end stations and bridges is available and (mostly) up to date. The TSN Translator on the TSN network side and the TSN Translator Client on the TSN End Station A side also support the LLDP protocol and exchange the LLDP parameters (e.g., source and destination MAC address) with their neighbours in the TSN network. Additionally, TSN Translator provides to TSN Translator Client TSN port information, including the mapping of ports to PDU sessions and QoS flows.

Figure 9:
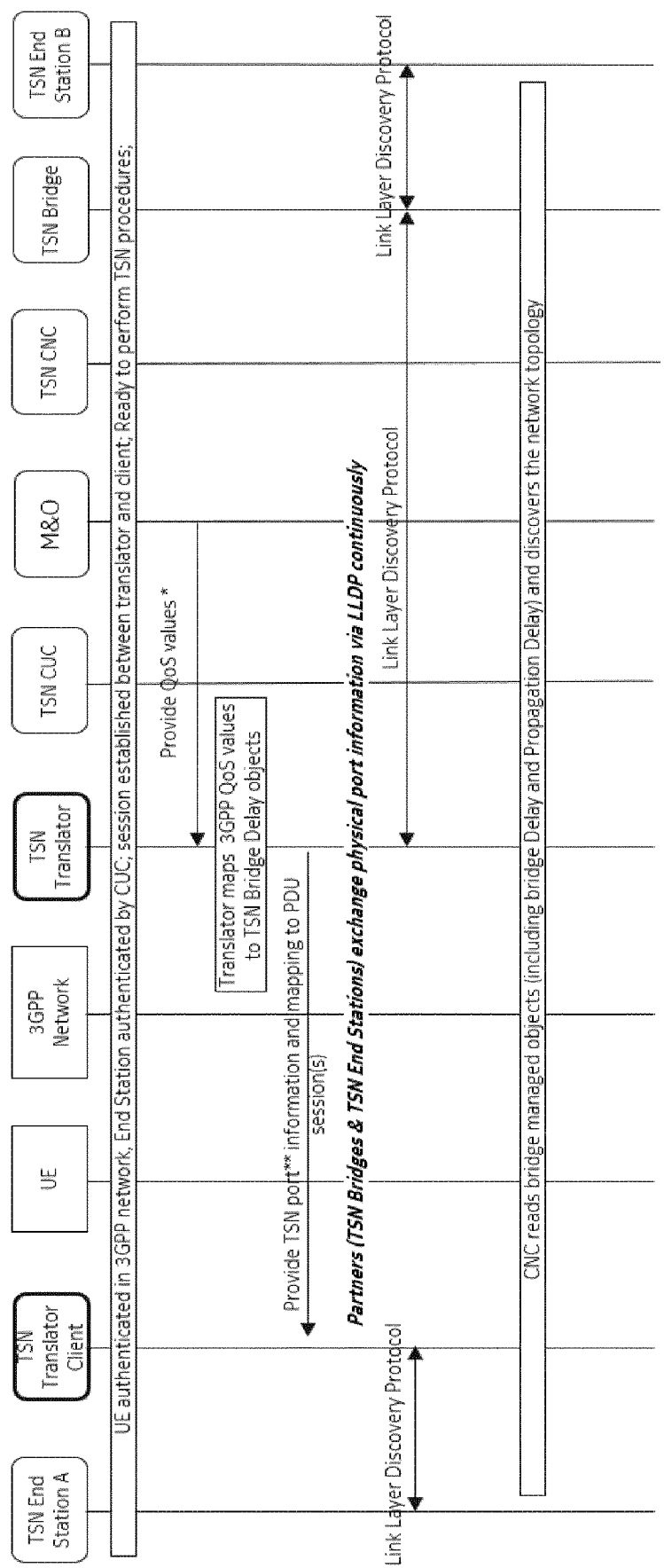
FIG. 9 shows interactions between 3GPP network and TSN entities during network discovery.

Typically, the CNC becomes aware of network topology by reading LLDP parameters and Bridge Delay objects from the TSN bridges. This information is not known to CUC, unless it is explicitly requested by CUC. The FIG. 9 shows this general case of TSN network discovery.

Figure 10:
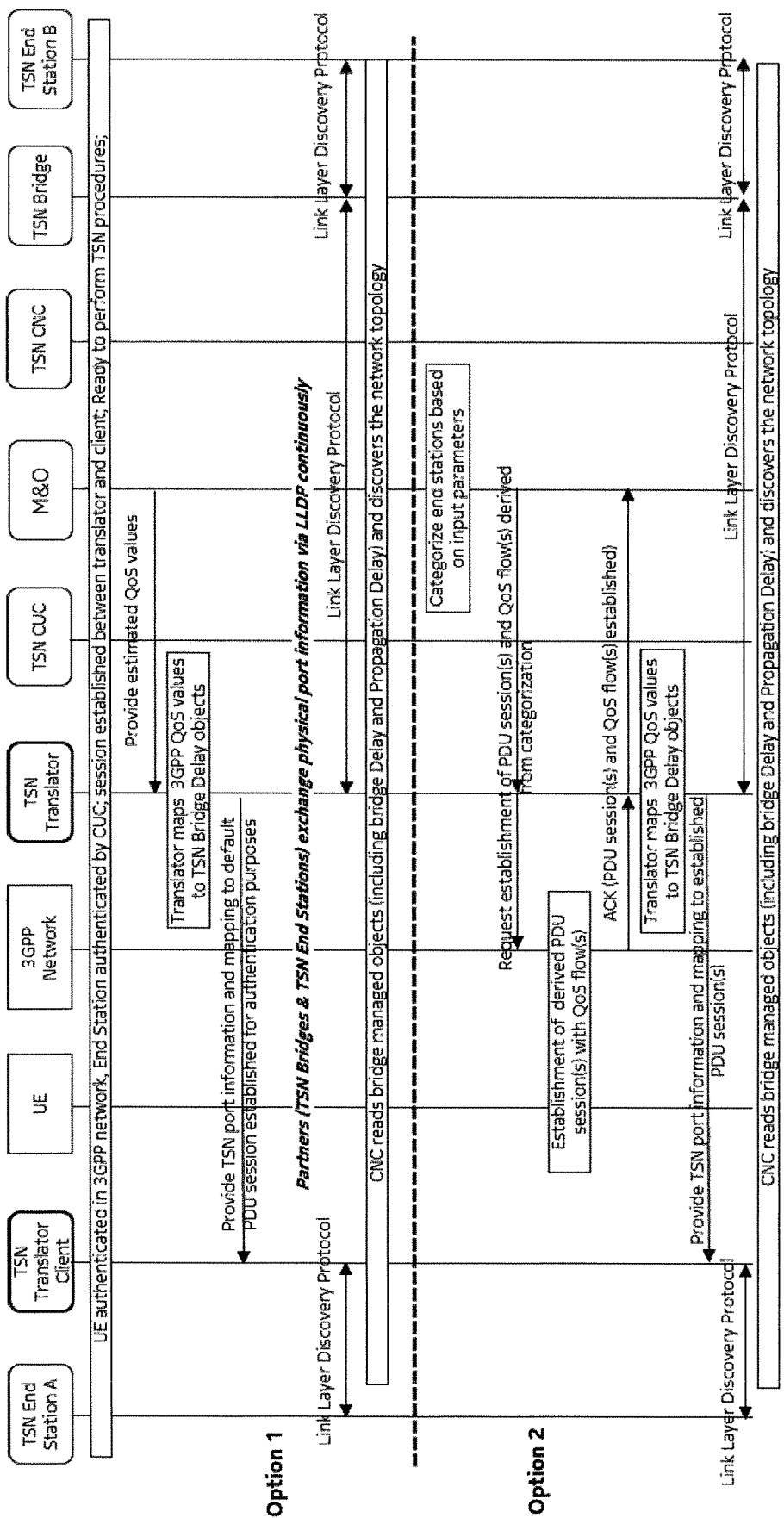
FIG. 10 shows message charts according to Options 1 and 2 for M&O driven derivation of 3GPP Bridge parameters according to some embodiments of the invention.
Figure 11:
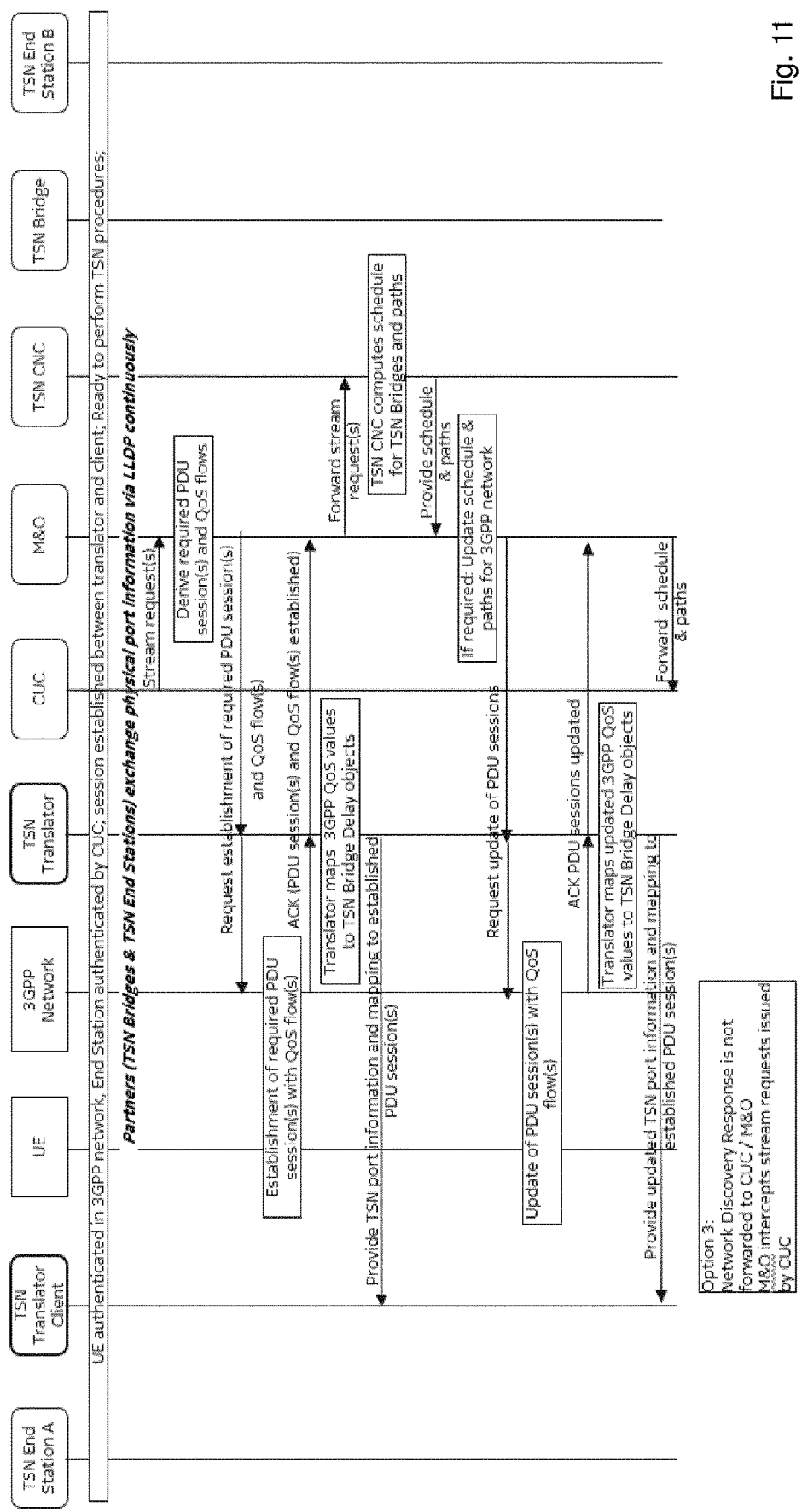
FIG. 11 shows message charts according to Option 3 for M&O driven derivation of 3GPP Bridge parameters according to some embodiments of the invention.

TSN bridges and end devices perform the LLDP procedures learning the connection information of their network peers. Such information in stored in managed objects on bridges and it is read by the CNC. During the discovery process, the TSN CNC will crawl through all the TSN bridges to collect information about the links they are connected to, their capacity, link propagation delay, bridge delay and the devices attached to the ports available to them, from the bridge managed objects. As a result, the CNC builds a view on physical topology of the network along with performance metrics and capabilities of the bridges and links. Since 3GPP network appears as a virtual TSN bridge to the TSN CNC, the TSN Translator and its TSN Translator Client manages corresponding bridge objects so that the TSN CNC can read this information. The ingress ports of the virtual TSN Bridge offered to the TSN End Station A are handled by the TSN Translator Client and the corresponding egress ports are handled by the TSN Translator. At least one PDU session in 3GPP network represents the connection between one ingress port and one egress port of the virtual TSN Bridge. The QoS flows with the different QoS parameters is analogous to the QoS handling of the TSN network. During the network discovery procedure, the QoS values that represent the capabilities of 3GPP network are provided by M&O entity. Such QoS values are translated by the TSN Translator to Bridge Delay managed object. As indicated in FIGS. 10 and 11, there are multiple options for M&O to establish and provide needed QoS parameters. In the following, a detailed description of options for M&O involvement according to some embodiments of the invention is provided. It also identifies their advantages and disadvantages:

- Option 1: (cf. FIG. 10, upper part) M&O provides a set of estimated/pre-determined values of QoS values to TSN Translator. Such estimated values can be derived for example from previous stream settings or from network planning information (e.g., collected in a database and processed using machine learning algorithms).

One exemplary way to derive QoS values from the established list of parameters is to use the 3GPP-defined UE category which, among others, indicates supported data rates. This quantity could be used to, e.g., build three categories of UEs: low, medium, and high traffic volume. In a similar way, default 5QI values (containing, among others, data rates, delay budget, and maximum packet error rates) could be utilized for such grouping. In a more empirical manner, the UE history can be used to generate a traffic profile, i.e., a frequency distribution of requested data rates.

There is no actual PDU session establishment envisioned within Option 1. Pre-determined QoS values serve only as an estimation on the capabilities that 3GPP network could offer with certain probability to future stream requests. However, as there is no actual PDU session establishment, no resources are reserved and guaranteed for future incoming stream requests. The PDU sessions are established only after the actual stream requests are received by TSN Translator from CNC.

Option 1 on the one hand enables fast and resource efficient network discovery of 3GPP network, as estimated QoS values can be communicated a priori and do not require PDU session establishments and resource reservation. On the other hand, the estimated values are not necessarily highly reliable as certain variation in QoS values is possible due to the volatility of wireless links. Additionally, as no PDU session establishment and thus no resource reservation is done in this phase, the estimated QoS values can be guaranteed only to a certain extent (with a certain probability). The TSN Translator maps the set of estimated QoS values received by M&O to corresponding Bridge Delay objects. The TSN Translator further derives TSN port information of 3GPP bridge and maps it to the default PDU session. This mapping is shared with TSN Translator Client. Bridge related parameters such as bridge delay are read by TSN CNC in order to discover the network. The TSN CNC can optionally forward the discovered information to the TSN CUC.

- Option 2: (cf. FIG. 10, lower part) In general, a bridge may comprise one or more TSN translators (corresponding to multiple sets of SMF, PCF and UPF), the core network and the radio access network and one or more UEs (terminal) of the wireless network (3GPP network), and one or more TSN translator clients. Each TSN translator client is related to one of the UEs. One UE may be related to one or more TSN translator clients. The TSN translator clients correspond to ports of a conventional bridge.

The process of initial setup and network planning makes M&O aware of existing devices (end stations, TSN translator clients) and their mapping to UEs including spatial distribution of UEs and topological constraints as well as their QoS characteristics and requirements. Based on such information (e.g. collected in a database and processed using machine learning algorithms), M&O can create groups/categories of end stations that correspond to certain QoS values (501 values)(i.e., have QoS values which are close to each other). M&O can instruct the TSN Translator to request the establishment of only a limited number of PDU sessions with identified $501s$. The M&O shall decide on actual number of PDU sessions that will be established in this phase (network discovery) based on the need to reserve/guarantee the resources in 3GPP network for incoming stream requests. E.g. for each pair of end stations that are expected to be a part of one stream and that belong to the category with the most stringent QoS requirements, a PDU session might be setup already in this phase. On the other hand, for devices with less demanding QoS requirements (such as temperature sensors with less frequent measurement readings) lower number of PDU sessions may be setup, i.e. less amount of resources will be reserved/guaranteed for future actual stream requests. The TSN Translator issues a request for establishment of PDU session(s) with specific QoS flow(s) towards the 3GPP network. For example, the specific QoS value may be an average or median value of the QoS requirements of the stations of the group. After receiving an acknowledgement that requested PDU session(s) with specific QoS flow(s) has been established, the TSN Translator updates the Bridge Delay and TSN port information along with corresponding mapping to PDU session(s), shares the latter with the TSN Translator Client, and sends ACK to the M&O entity. Such parameters are read by TSN CNC in order to discover the network. The TSN CNC can optionally forward the discovered information to the TSN CUC.

Option 2 allows for more reliable feedback on actually requested QoS parameters at the cost of more resource reservation. The level of required reliability and the level of guarantees that 3GPP network can provide can be adjusted by M&O by categorization of end devices and decision on the number of PDU sessions to be set up.

- Option 3 (cf. FIG. 11): M&O intercepts stream requests issued by a CUC.

Reading the requirements of the stream to be set up, it can derive the required PDU session(s) and QoS flows of the 3GPP system. An according session establishment request is sent to the TSN Translator, which in turn issues an PDU session establishment request to the 3GPP network. After receiving the acknowledgment that the PDU session(s) has (have) been established, the TSN translator maps the PDU session's 501 values to the according Bridge Delay object parameters. M&O, upon receiving the ACK for successful PDU session establishment, forwards the stream requests to the TSN CNC which computes the schedule and paths for the requested stream(s). CNC returns this to CUC, but it is first intercepted by M&O in order to check for necessary updates of the PDU sessions established before. E.g. in case of failure to compute feasible schedule, the M&O can request such updates using the same procedure as for PDU session establishment, including update of Bridge Delay parameters. Afterwards, M&O triggers the re-computation of feasible schedule by re-submitting the original stream request to the CNC. Once the schedule has successfully been computed it is forwarded to the original recipient, the TSN CUC.

Under assumption that the frequency with which the CNC performs the network discovery is high, the CNC always has "up to date" information about the network, hence no explicit trigger for network discovery is needed after the establishment of the new PDU sessions. Alternatively, the M&O can trigger CNC to perform such explicit network discovery every time the M&O received an acknowledgement for newly established PDU sessions.

Establishment of End to End Communication

For establishment of a communication between one (or multiple) talkers and one (or multiple) listeners, the TSN CUC reads the QoS parameters and stream requirements from the TSN End Stations A and B. In the usual TSN procedure, this information and the information about the TSN End Stations A and B (e.g. MAC addresses) to be connected are then provided to the TSN CNC. However, in some embodiments of this invention, the M&O entity intercepts the Stream Request message in order to check whether existing (i.e., already established) PDU sessions can fulfil the requirements or if new/modified PDU session need to be set up, as depicted in FIG. 11. In the latter case the M&O instructs the TSN Translator to trigger the 3GPP network to set up PDU session(s), QoS flow(s), and/or update QoS flow parameters respectively. Only afterwards, the stream request is forwarded to TSN CNC.

The TSN CNC computes the scheduling related parameters for the TSN Bridges and the End Stations. In the default TSN procedures, the result is provided to the TSN CUC. However, in some embodiments of the invention, the M&O entity intercepts the result of the CNC calculation and checks again whether or not changes are needed in the PDU sessions of the 3GPP network (like shown in FIG. 11). Only after potential changes are acknowledged from 3GPP network and TSN Translator, respectively, the schedule is forwarded to TSN CUC. The TSN CUC configures the TSN End Stations A and B with the computed scheduling related parameters and finally initiates the start of the message transfer at the End Station A at a specified time.

FIG. 12 shows an apparatus according to an embodiment of the invention. The apparatus may be a TSN translator or an element thereof. FIG. 13 shows a method according to an embodiment of the invention. The apparatus according to FIG. 12 may perform the method of FIG. 13 but is not limited to this method. The method of FIG. 13 may be performed by the apparatus of FIG. 12 but is not limited to being performed by this apparatus.

The apparatus comprises first means for monitoring 10, first means for translating 20, first means for forwarding 30, second means for translating 40, first means for responding 50, means for observing 60, means for storing 70, means for inhibiting 80, and second means for responding 90. The first means for monitoring 10, first means for translating 20, first means for forwarding 30, second means for translating 40, first means for responding 50, means for observing 60, means for storing 70, means for inhibiting 80, and second means for responding 90 may be a first monitoring means, first translating means, first forwarding means, second translating means, first responding means, observing means, storing means, inhibiting means, and second responding means, respectively. The first means for monitoring 10, first means for translating 20, first means for forwarding 30, second means for translating 40, first means for responding 50, means for observing 60, means for storing 70, means for inhibiting 80, and second means for responding 90 may be a monitor, first translator, first forwarder, second translator, first responder, observer, memory, inhibitor, and second responder, respectively. The first means for monitoring 10, first means for translating 20, first means for forwarding 30, second means for translating 40, first means for responding 50, means for observing 60, means for storing 70, means for inhibiting 80, and second means for responding 90 may be a first monitoring processor, first translating processor, first forwarding processor, second translating processor, first responding processor, observing processor, storing processor, inhibiting processor, and second responding processor, respectively.

The first means for monitoring 10 monitors if a session establishment request is received from a wireline network (S10). The session establishment request requests providing a first requested quality of service for a first data session to a station of the wireline network.

The first means for translating 20 translates the session establishment request into a request for providing a second data session of a wireless network having a second requested quality of service corresponding to the first requested quality of service (S20). The first means for forwarding 30 forwards the request for providing the second data session to the wireless network (S30).

The second means for translating 40 translates an indication of a second provided quality of service of the second data session into an indication of a first provided quality of service of the first data session (S40). The indication of the second provided quality of service is comprised in a response to the request for providing the second data session of S20, and the response is received from the wireless network.

The first means for responding 50 provides a response to the session establishment request (S50). The response to the session establishment request comprises the indication of the first provided quality of service obtained in S40.

On the other hand, the means for observing 60 observes if a first indication of an estimated quality of service is received (S60). If the first indication of the estimated quality of service is received (S60="yes"), the means for storing 70 stores a second indication of the estimated quality of service (S70). The means for inhibiting 80 inhibits any requesting the wireless network to provide a third data session having the estimated quality of service (S80). I.e., due to receiving the first indication of the estimated quality of service, the wireless network is not requested to provide a third data session and, consequently, the wireless network does not provide a third data session.

S10 to S50 may be performed fully or partly in parallel to S60 to S80. S10 to S50 may be performed fully or partly prior to S60 to S80. S10 to S50 may be performed fully or partly after S60 to S80.

The second means for responding 90 responds to a received network discovery request by a network discovery response (S90). The network discovery response comprises a third indication of the estimated quality of service if the second indication of the estimated quality of service is stored in S70 and the response to the session establishment is not provided in S50. On the other hand, the network discovery response comprises an indication of the first provided quality of service if the response to the session establishment is provided in S50.

FIG. 14 shows an apparatus according to an embodiment of the invention. The apparatus may be a M&O or an element thereof. FIG. 15 shows a method according to an embodiment of the invention. The apparatus according to FIG. 14 may perform the method of FIG. 15 but is not limited to this method. The method of FIG. 15 may be performed by the apparatus of FIG. 14 but is not limited to being performed by this apparatus.

The apparatus comprises means for predicting 110 and means for informing 120. The means for predicting 110 and means for informing 120 may be a predicting means and informing means, respectively. The means for predicting 110 and means for informing 120 may be a predictor and informer, respectively. The means for predicting 110 and means for informing 120 may be a predicting processor and informing processor, respectively.

The means for predicting 110 predicts a predicted quality of service provided by a bridge for a stream through the bridge based on at least one of settings related to previous streams through the bridge and network planning information (S110). The means for informing 120 informs the bridge on the predicted quality of service obtained in S110 (S120).

FIG. 16 shows an apparatus according to an embodiment of the invention. The apparatus may be a M&O or an element thereof. FIG. 17 shows a method according to an embodiment of the invention. The apparatus according to FIG. 16 may perform the method of FIG. 17 but is not limited to this method. The method of FIG. 17 may be performed by the apparatus of FIG. 18 but is not limited to being performed by this apparatus.

The apparatus comprises means for deriving 210, means for requesting 220, means for checking 230, means for forwarding 240, and means for inhibiting 250. The means for deriving 210, means for requesting 220, means for checking 230, means for forwarding 240, and means for inhibiting 250 may be a deriving means, requesting means, checking means, forwarding means and inhibiting means, respectively. The means for deriving 210, means for requesting 220, means for checking 230, means for forwarding 240, and means for inhibiting 250 may be a deriver, requestor, checker, forwarder, and inhibitor, respectively. The means for deriving 210, means for requesting 220, means for checking 230, means for forwarding 240, and means for inhibiting 250 may be a deriving processor, requesting processor, checking processor, forwarding processor and inhibiting processor, respectively.

The means for deriving 210 derives a requested quality of service to be provided by a bridge for a session based on a request for setting up the session received from a user configurator, such as a CUC (S210).

The means for requesting 220 requests the bridge to reserve a resource to provide the requested quality of service to the session (S220). The means for checking 230 checks if the bridge provides the requested quality of service to the session (S230). The checking by the means for checking 230 is based on a response received from the bridge in response to the requesting of S220.

If the bridge provides the requested quality of service (S230="yes"), the means for forwarding 240 forwards the request for setting up the session (see S210) to a network controller, such as a CNC, different from the user configurator (S240).

On the other hand, if the bridge does not provide the requested quality of service (S230="no"), the means for inhibiting 250 inhibits the forwarding of the request for setting up the session (S250).

Figure 19:
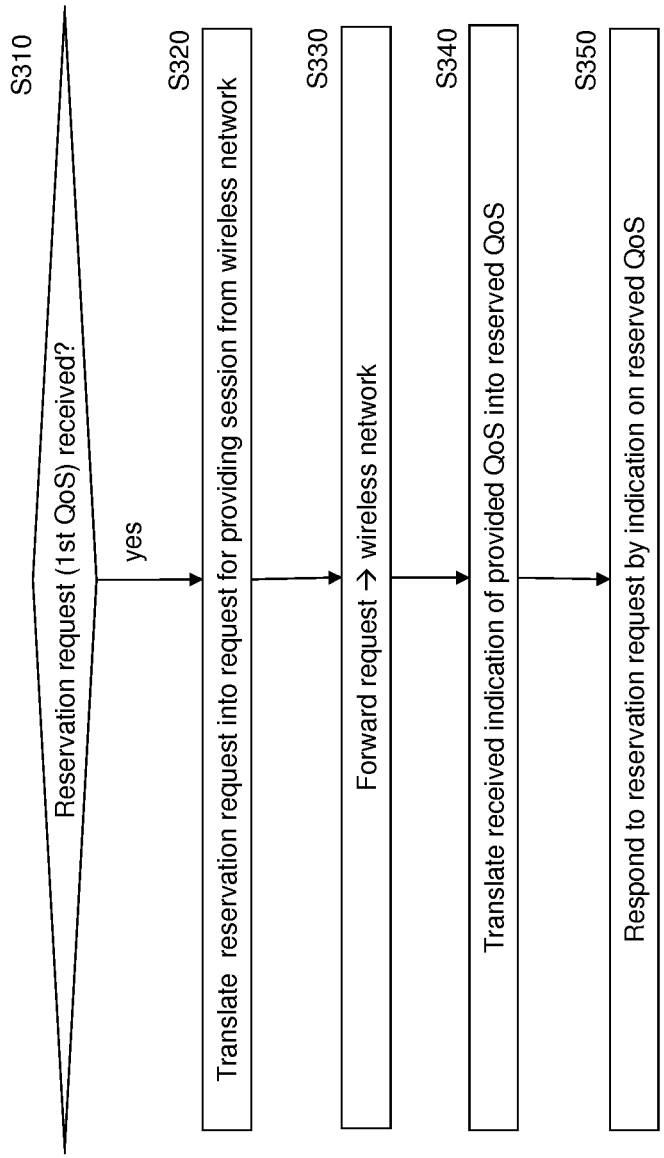
FIG. 19 shows a method according to an embodiment of the invention.
Figure 18:
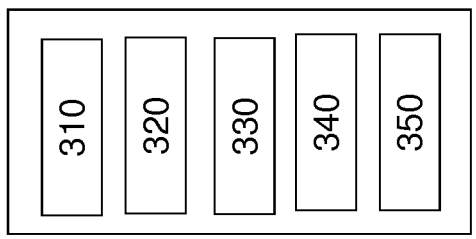
FIG. 18 shows an apparatus according to an embodiment of the invention.

FIG. 18 shows an apparatus according to an embodiment of the invention. The apparatus may be a TSN translator or an element thereof. FIG. 19 shows a method according to an embodiment of the invention. The apparatus according to FIG. 18 may perform the method of FIG. 19 but is not limited to this method. The method of FIG. 19 may be performed by the apparatus of FIG. 18 but is not limited to being performed by this apparatus.

The apparatus comprises means for monitoring 310, first means for translating 320, means for forwarding 330, second means for translating 340, and means for responding 350. The means for monitoring 310, first means for translating 320, means for forwarding 330, second means for translating 340, and means for responding 350 may be a monitoring means, first translating means, forwarding means, second translating means and responding means, respectively. The means for monitoring 310, first means for translating 320, means for forwarding 330, second means for translating 340, and means for responding 350 may be a monitor, first translator, forwarder, second translator, and responder, respectively. The means for monitoring 310, first means for translating 320, means for forwarding 330, second means for translating 340, and means for responding 350 may be a monitoring processor, first translating processor, forwarding processor, second translating processor and responding processor, respectively.

The means for monitoring 310 monitors if a reservation request is received from a controller such as a CNC (S310). The reservation request requests to reserve resources for a data session having a first quality of service.

If the reservation request is received (S310="yes") the first means for translating 320 translates the reservation request into a request for providing a data session of a wireless network having a requested quality of service (S320). The requested quality of service corresponds to the first quality of service. The means for forwarding 330 forwards the request for providing the data session of S320 to the wireless network (S330).

The second means for translating 340 translates an indication of a provided quality of service of the data session into an indication of a reserved quality of service (S340). The indication of the provided quality of service is comprised in a response to the request for providing the data session received from the wireless network. The reserved quality of service corresponds to the provided quality of service.

The means for responding 350 responds to the reservation request of S310 by a reservation response (S350). The reservation response comprises the indication of the reserved quality of service.

Figure 20:
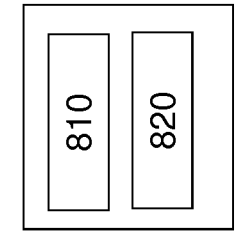
FIG. 20 shows an apparatus according to an embodiment of the invention.

FIG. 20 shows an apparatus according to an embodiment of the invention. The apparatus comprises at least one processor 810, at least one memory 820 including computer program code, and the at least one processor 810, with the at least one memory 820 and the computer program code, being arranged to cause the apparatus to at least perform the method according to one of FIGS. 13, 15, 17, and 19.

Some embodiments of the invention are described with respect to a 3GPP network. However, the invention is not limited to 3GPP networks. It may be applied to other wireless networks such as a WiFi network, too.

Some embodiments of the invention are described with respect to an industrial TSN network. However, the invention is not limited to industrial TSN networks. It may be applied to other (non-industrial) TSN networks such as Profinet and to other fixed line networks, too.

FIG. 2 shows an example where one of the TSN bridges is replaced by a 3GPP network embedded between TSN translator and TSN translator client. In some embodiments of the invention, one or more or even all bridges of the TSN network may be replaced by respective 3GPP networks embedded between respective TSN translator and TSN client. In case of plural replaced bridges, some or all of the respective 3GPP networks may be the same (i.e. one 3GPP network), wherein different replaced TSN bridges correspond to different sets of PDU sessions in the 3GPP network (i.e., a single TSN bridge corresponds to one set of PDU sessions, wherein each set may comprise one or more PDU sessions). In addition, the respective UE may be the same or different for different replaced TSN bridges.

According to FIG. 4, the end station A is authenticated by TSN CUC before TSN translator client fully opens the port. However, in some embodiments of the invention, authentication by TSN CUC may be omitted and TSN translator client fully opens the port for end station A once the same is up and running and the UE is authenticated in the 3GPP network. This might be useful in particular if UE is integrated with TSN end station A. In this case, one authentication may be sufficient.

Options 2 and 3 are described hereinabove such that M&O provides the information about the (estimated/requested) QoS directly to the TSN translator. However, in some embodiments, M&O may provide this information to CNC which forwards it to the TSN translator. Thus, an interface between M&O and TSN translator may not be needed but an additional message exchange is required.

One piece of information may be transmitted in one or plural messages from one entity to another entity. Each of these messages may comprise further (different) pieces of information.

Names of network elements, protocols, and methods are based on current standards. In other versions or other technologies, the names of these network elements and/or protocols and/or methods may be different, as long as they provide a corresponding functionality.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software. Each of the entities described in the present description may be embodied in the cloud.

According to the above description, it should thus be apparent that example embodiments of the present invention provide, for example, a translator, or a component thereof, an apparatus embodying the same, a method for controlling and/or operating the same, and computer program(s) controlling and/or operating the same as well as mediums carrying such computer program(s) and forming computer program product(s). According to the above description, it should thus be apparent that example embodiments of the present invention provide, for example, a M&O, or a component thereof, an apparatus embodying the same, a method for controlling and/or operating the same, and computer program(s) controlling and/or operating the same as well as mediums carrying such computer program(s) and forming computer program product(s).

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof.

It is to be understood that what is described above is what is presently considered the preferred embodiments of the present invention. However, it should be noted that the description of the preferred embodiments is given by way of example only and that various modifications may be made without departing from the scope of the invention as defined by the appended claims.

The invention claimed is:

1. An apparatus, comprising:
at least one processor; and
at least one memory including computer program code;
the at least one memory and the computer program code configured to, with the at least one processor, cause the apparatus at least to:
monitor if a reservation request is received from a controller, wherein the reservation request requests to reserve resources for a data session having a first quality of service;
translate the reservation request into a request for providing a data session of a wireless network having a requested quality of service corresponding to the first quality of service if the reservation request is received;
forward the request for providing the data session to the wireless network;
translate an indication of a provided quality of service of the data session comprised in a response to the request for providing the data session received from the wireless network into an indication of a reserved quality of service corresponding to the provided quality of service; and
respond to the reservation request by a reservation response; wherein
the reservation response comprises the indication of the reserved quality of service.

2. An apparatus, comprising:
at least one processor; and
at least one memory including computer program code;
the at least one memory and the computer program code configured to, with the at least one processor, cause the apparatus at least to:
predict that a bridge in a time sensitive networking system provides a predicted quality of service for a stream through the bridge based on at least one of settings related to previous streams through the bridge and network planning information;
inform the bridge on the predicted quality of service;
instruct the bridge to reserve a resource corresponding to the predicted quality of service; and
instruct the bridge to not reserve a resource corresponding to the predicted quality of service.

3. An apparatus, comprising:
at least one processor; and
at least one memory including computer program code;
the at least one memory and the computer program code configured to, with the at least one processor, cause the apparatus at least to:
predict that a bridge provides a predicted quality of service for a stream through the bridge based on at least one of settings related to previous streams through the bridge and network planning information;
inform the bridge on the predicted quality of service; and store configuration information of the bridge, wherein, according to the configuration information, the bridge comprises one or more translators, a core network of a wireless network, a radio access network of the wireless network, a plurality of terminals of the wireless network, and a plurality of translator clients;

according to the configuration information, each of the translator clients is related to a respective one of the plurality of terminals;

according to the configuration information, the stream through the bridge passes through one of one or more translators, the core network, the radio network, one of the terminals, and one of the translator clients;

wherein the memory and computer program code are further configured to predict, for each of the terminals, a respective predicted quality of service provided by the bridge for a respective stream through the respective terminal based on at least one of settings related to previous streams through the respective terminal and the network planning information;

group some terminals of the plurality of terminals into a group, wherein differences or quotients between the predicted qualities of service for any two of the terminals of the group are within a predetermined range;

determine a group predicted quality of service based on the predicted qualities of service of the terminals of the group; and each of the one or more translators on the group predicted quality of service for the terminals of the group.

4. A method, comprising:

monitoring if a reservation request is received from a controller, wherein the reservation request requests to reserve resources for a data session having a first quality of service;

translating the reservation request into a request for providing a data session of a wireless network having a requested quality of service corresponding to the first quality of service if the reservation request is received;

forwarding the request for providing the data session to the wireless network;

translating an indication of a provided quality of service of the data session comprised in a response to the request for providing the data session received from the wireless network into an indication of a reserved quality of service corresponding to the provided quality of service; and responding to the reservation request by a reservation response;

wherein the reservation response comprises the indication of the reserved quality of service.

5. A method, comprising:

predicting that a bridge in a time sensitive networking system provides a predicted quality of service for a stream through the bridge based on at least one of settings related to previous streams through the bridge and network planning information; and informing the bridge on the predicted quality of service, wherein one of the informing comprises instructing the bridge to reserve a resource corresponding to the predicted quality of service, and the informing comprises instructing the bridge to not reserve a resource corresponding to the predicted quality of service.

6. A method, comprising:

predicting that a bridge provides a predicted quality of service for a stream through the bridge based on at least one of settings related to previous streams through the bridge and network planning information;

informing the bridge on the predicted quality of service; and storing configuration information of the bridge, wherein, according to the configuration information, the bridge comprises one or more translators, a core network of a wireless network, a radio access network of the wireless network, a plurality of terminals of the wireless network, and a plurality of translator clients;

according to the configuration information, each of the translator clients is related to a respective one of the plurality of terminals;

according to the configuration information, the stream through the bridge passes through one of one or more translators, the core network, the radio network, one of the terminals, and one of the translator clients;

the predicting comprises predicting, for each of the terminals, a respective predicted quality of service provided by the bridge for a respective stream through the respective terminal based on at least one of settings related to previous streams through the respective terminal and the network planning information; and the method further comprises grouping some terminals of the plurality of terminals into a group, wherein differences or quotients between the predicted qualities of service for any two of the terminals of the group are within a predetermined range;

determining a group predicted quality of service based on the predicted qualities of service of the terminals of the group; wherein the informing comprises informing each of the one or more translators on the group predicted quality of service for the terminals of the group.

7. A computer program product embodied on a non-transitory computer readable medium, said computer program product comprising a set of instructions which, when executed on an apparatus, is configured to cause the apparatus to carry out the method according to claim 4.

8. A computer program product embodied on a non-transitory computer readable medium, said computer program product comprising a set of instructions which, when executed on an apparatus, is configured to cause the apparatus to carry out the method according to claim 5.

9. The apparatus according to claim 2, wherein the bridge comprises a time sensitive network translator, and wherein the time sensitive network translator of the bridge is informed on the predicted quality of service.

10. The method according to claim 5, wherein the bridge comprises a time sensitive network translator, and wherein the time sensitive network translator of the bridge is informed on the predicted quality of service.

* * * * *